United States Patent
Sugita

(10) Patent No.: US 7,773,820 B2
(45) Date of Patent: Aug. 10, 2010

(54) DATA COMPRESSION APPARATUS AND DATA COMPRESSION PROGRAM STORAGE MEDIUM

(75) Inventor: Yukio Sugita, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1019 days.

(21) Appl. No.: 11/508,952

(22) Filed: Aug. 24, 2006

(65) Prior Publication Data

US 2007/0047827 A1    Mar. 1, 2007

(30) Foreign Application Priority Data

Aug. 24, 2005   (JP)   ............... 2005-242170

(51) Int. Cl.
  *G06K 9/36*   (2006.01)
  *G06K 9/46*   (2006.01)
(52) U.S. Cl. ...................... 382/239; 382/232
(58) Field of Classification Search ............... None
  See application file for complete search history.

(56) References Cited

U.S. PATENT DOCUMENTS

| | | | | |
|---|---|---|---|---|
| 4,776,029 A | * | 10/1988 | Shimura | 382/238 |
| 6,782,133 B2 | * | 8/2004 | Yokose et al. | 382/232 |
| 6,996,278 B2 | * | 2/2006 | Ohyama et al. | 382/232 |
| 7,183,950 B2 | * | 2/2007 | Sugita | 341/76 |
| 2006/0285756 A1 | * | 12/2006 | Sugita | 382/232 |

FOREIGN PATENT DOCUMENTS

| | | | |
|---|---|---|---|
| JP | 5-328142 | A | 12/1993 |
| JP | 9-200540 | A | 7/1997 |
| JP | 10-164620 | A | 6/1998 |
| JP | 2001-520822 | A | 10/2001 |
| WO | WO98/47234 | A1 | 10/1998 |

* cited by examiner

*Primary Examiner*—Yuzhen Ge
(74) *Attorney, Agent, or Firm*—Sughrue Mion, PLLC

(57) ABSTRACT

A data compression apparatus includes a thinning section that thins numerical values from a succession of values constituting compressed data to create first and second compressed data; a reversible compression section for the first compressed data; a detecting section that detects an edge portion of the image; and a non-reversible compression section that processes the second compressed data based on a result of the edge detection. When the detecting section detects no edge portion, the non-reversible compression section outputs a predetermined code of a number of bits. When the detecting section detects the edge portion, the non-reversible compression section outputs a first value based on image numerical value when involved with a predetermined positional relation expressed by a first number of bits and a second value expressed by a few number of bits than the first number when the image numerical value is not involved with a predetermined positional relation.

13 Claims, 16 Drawing Sheets

| BEFORE CODING | AFTER CODING |
| --- | --- |
| A1 | 00 |
| A2 | 01 |
| A3 | 100 |
| A4 | 101 |
| A5 | 11000 |
| A6 | 11001 |
| A7 | 11101 |
| A8 | 11011 |
| A9 | 111000 |
| A10 | 111001 |
| A11 | 111010 |
| A12 | 111011 |
| A13 | 111100 |
| A14 | 111101 |
| A15 | 111110 |
| A16 | 111111 |

Fig. 15

| AFTER CODING | BEFORE CODING |
|---|---|
| 1000 | 0-31 |
| 1001 | 32-63 |
| 1010 | 64-95 |
| 1011 | 96-127 |
| 1100 | 128-159 |
| 1101 | 160-191 |
| 1110 | 192-223 |
| 1111 | 224-255 |

Fig. 16

DATA COMPRESSION APPARATUS AND DATA COMPRESSION PROGRAM STORAGE MEDIUM

BACKGROUND OF THE INVENTION

1. Field of the Invention

The present invention relates to a data compression apparatus for compressing data such as image data, and a data compression program storage medium storing a data compression program, which causes an information processing apparatus such as a computer to operate as the data compression apparatus.

2. Description of the Related Art

Hitherto, in order to reduce storage capacity or traffic, there is widely adopted a technology of compressing data such as image data.

For example, Japanese Patent Laid Open Gazette TokuKai Hei. 5-328142 discloses a technology as set forth below.

When a CLUT (color lookup table) is constructed through selection of a representative color from an original image, color numbers are allotted so that a series of color numbers has a closed value of color data, and then a bit map associated with the CLUT is created to determine a difference of color numbers between adjacent pixels. In the event that the difference takes a large value, the color number of the bit map is altered in such an extent that no deterioration of image quality occurs, so that the difference is biased to a small value, and a run length coding is applied to difference data.

Japanese Patent Laid Open Gazette TokuKai Hei. 10-164620 discloses a technology as set forth below.

Image data consisting of a plurality of data allotted to the associated colors is encoded on a non-reversible compression basis. One of the data is allotted to a transparent color, which is reversible. The image data comprises an immediate value (a first value in differential coding) and a plurality of differential values (a previous value in differential coding) subsequent to the immediate value. When those values are encoded on a non-reversible compression basis, the immediate value and the differential values representative of the transparent color are provided on a reversible basis. And the immediate value representative of the transparent color is expressed by an intermediate value of the data values for respective colors, or the differential values representative of the transparent color is expressed by "0".

Japanese Patent Publication Tokuhyo No. 2001-5-20822 discloses a technology in which encoding is carried out by a difference between the predicted number (s' (j)) and the actual number (s (j)).

Japanese Patent Laid Open Gazette TokuKai Hei. 9-200540 discloses an image compression apparatus in which for Nth line of pixel data train, the state of distributions of the same pixel data in the sub-scanning direction is recognized, and the state of distributions of the same pixel data in the main scanning direction is recognized, so that it is decided in accordance with the results of those recognition whether the same pixel data continued in the sub-scanning direction are to be subjected to a compression processing, or the same pixel data continued in the main scanning direction are to be subjected to a compression processing.

Here, there will be explained a system to which a data compression technology is applied.

FIG. 1 is a view useful for understanding an example of a print system to which a data compression technology is applied. FIG. 2 is a view useful for understanding a data processing in the print system.

As shown in FIG. 1, the print system comprises a host controller 100, an interface equipment 200, and a printer 300. The host controller 100 is connected to the interface equipment 200 via an all-purpose interface cable 150 such as SCSI. And the interface equipment 200 is connected to the printer 300 via a dedicated interface cable 250.

In the host controller 100, as shown in FIG. 2, data 11 of images and characters described in various languages and formats, such as PDF, PS, TIFF, are divided into image (CT; Continuous Tone) data and characters and lines (LW; Line Work) data, and RIP (Raster Image Processing) is applied to such two types of data, so that bit map data 12A and 13A are created. Further, data compression processing is applied to such two types of data, so that non-reversible compression data 14 is created on the CT and reversible compression data 15 is created on the LW. Those types of compression data 14 and 15 are transmitted from the host controller 100 via the all-purpose interface cable 150 shown in FIG. 1 to the interface equipment 200. The interface equipment 200 applies a data expansion processing to the transmitted compression data 14 and 15 to creates bit map data 12B and 13B associated with the bit map data 12A and 13A, respectively, which are in the state before an application of the data compression processing by the host controller 100. With respect to the CT data, when the host controller 100 performs the data compression, the non-reversible compression processing is carried out. Accordingly, it is difficult to completely return the CI data after the data expansion, or the bit map data 12B to the CI data before the data compression, or the bit map data 12A. However, it is possible to reproduce the substantially same bit map data. With respect to the LW data, when the host controller 100 performs the data compression, the reversible compression processing is carried out. Accordingly, it is possible to restore the LW data after the data expansion, or the bit map data 13B to the LW data before the data compression, or the bit map data 13A.

The interface equipment 200 synthesizes the CI data after the data expansion or the bit map data 12B with the LW data after the data expansion or the bit map data 13B, and transmits the synthesized data to the printer 300 together with halftone dot information and the like in form of a tag. The printer 300 prints out an image in accordance with the bit map data received from the interface equipment 200 and the attached tag information.

In the event that there is a need that the host controller 100 and the interface equipment 200 are individually constructed in form of a separated apparatus, for example, in a case where the host controller 100 and the interface equipment 200 are mutually isolated, and in case of a system in which the interface equipment 200 receives image data from a plurality of host controllers, as shown in FIG. 2, there is provided such an arrangement that data is transferred to the interface equipment 200 through data compression by the host controller 100, so that the interface equipment 200 performs data expansion. This arrangement makes it possible to reduce a transfer time of the data from the host controller 100 to the interface equipment 200, and thereby improving the productivity of the print.

Generally, with respect to the CT data, there is adopted a compression system such as JPEG, which is high in compressibility, while it is non-reversible. On the other hand, with respect to the LW data, there is adopted a reversible compression system such as PackBits.

However, the compression system such as JPEG takes a lot of time for compression processing in software, and is a cause of the deterioration of the processing ability of the compression processing system in its entirety.

SUMMARY OF THE INVENTION

In view of the foregoing, it is an object of the present invention to provide a data compression apparatus capable of performing new and preferable data compression processing applicable to the compression of the CT data, and a data compression program storage medium storing a data compression program, which causes an information processing apparatus such as a computer to operate as the data compression apparatus capable of performing a data compression processing applicable to the compression of the CT data.

To achieve the above-mentioned object, the present invention provides a data compression apparatus that applies a data compression processing to data to be compressed, in which a two-dimensional image is represented by a succession of numerical values represented by a predetermined number of unit bits, the data compression apparatus comprising:

a thinning processing section that periodically thins numerical values from the succession of numerical values constituting compressed data so as to create a first compressed data consisting of a succession of numerical values derived from thinned compressed data, and a second compressed data consisting of a succession of remained numerical values;

a reversible compression section that applies reversible compression processing to the first compressed data created thinning processing section;

a detecting section that detects an edge portion of the image; and a non-reversible compression section that provides such processing that when the detecting section detects no edge portion on the numerical values constituting the second compressed data created in the thinning processing section, the non-reversible compression section outputs a predetermined code of a number of bits that is less than the predetermined number of unit bits, when the detecting section detects the edge portion, the non-reversible compression section outputs, on a numerical value that is involved in a predetermined positional relation on the image with the numerical values constituting the first compressed data, a numerical value in which the numerical value involved in the predetermined positional relation is expressed by a first number of bits that is less than the predetermined number of unit bits, and the non-reversible compression section outputs, on a numerical value that is not involved in the predetermined positional relation on the image with the numerical values constituting the first compressed data, a numerical value in which the numerical value not involved in the predetermined positional relation is expressed by a second number of bits that is less than the first number of bits.

It is noted that the predetermined code includes 0 bit of code (that is, nothing is outputted). The decoding for the 0 bit of code is carried out in accordance with a procedure as set forth below for instance.

It is decided in accordance with the decoded TRUE pixel whether the edge portion is concerned with. In the event that it is decided that the edge portion is concerned with, the FAKE pixel is decoded from the numerical value of the less number of bits. In the event that it is decided that the edge portion is not concerned with, the FAKE pixel is created by the interpolation processing using the TRUE pixel.

In the data compression apparatus according to the present invention as mentioned above, it is acceptable that the non-reversible compression section omits lower digits of bit values of the predetermined number of unit bits to express the numerical values with the first number of bits and/or the second number of bits.

In the data compression apparatus according to the present invention as mentioned above, it is preferable that the non-reversible compression section comprises:

a difference creating section that determines differences between a plurality of numerical values each adjacent to an associated numerical value on a succession of numerical values constituting the first compressed data created in the thinning processing section, so that new compressed data consisting of a succession of numerical values representative of the differences is created;

an offset section that offsets the numerical values constituting the new compressed data, which are created in the difference creating section, by a predetermined value;

a dividing section that divides the individual numerical values of the compressed data offset in numerical value by the offset section into an upper order unit bit portion and a lower order unit bit portion at a predetermined number of divisional bits that is less than the predetermined number of unit bits, so that the compressed data is divided into upper order data consisting of a succession of numerical values of the upper order unit bit portion and lower order data consisting of a succession of numerical values of the lower order of unit bit portion;

an upper order data compression section that applies reversible compression processing to the upper order data divided by the dividing section; and a lower order data compression section that applies the reversible compression processing to the lower order data divided by the dividing section.

Here, it is acceptable that the word "adjacent" appearing on the definition "determines differences between pluralities of numerical values each adjacent to an associated numerical value on a succession of numerical values constituting the first compressed data" is interpreted as being adjacent on the data stream. However, the present invention is not restricted to this interpretation. For example, in the event that two-dimensional image data is treated as a one-dimensional stream-like configuration of data, it is acceptable that the word "adjacent" is interpreted as being adjacent on a two-dimensional image. It is noted that the "differences between pluralities of numerical values each adjacent to an associated numerical value" include not only the one-dimensional difference but also the two-dimensional difference.

In the data compression apparatus according to the present invention as mentioned above, it is preferable that the detecting section detects an edge portion of the image in accordance with the differences determined by the difference creating section.

In the data compression apparatus according to the present invention as mentioned above, it is preferable that the difference creating section determines a two-dimensional difference based on a plurality of numerical values each adjacent to an associated numerical value in a plurality of directions looking on an image, on the numerical values constituting the first compressed data, and the detecting section detects an edge portion of the image in accordance with the difference determined by the difference creating section.

In the data compression apparatus according to the present invention as mentioned above, it is preferable that the upper order data compression section comprises a first coding section that performs such coding processing that numerical values excepting one or a plurality of predetermined compression subject numerical values of the upper order data are directly outputted without any processing, and compression subject numerical values are encoded into the compression subject numerical values and numerical values indicative of a continued number of the same compression subject numerical values as the compression subject numerical values.

In the data compression apparatus according to the present invention as mentioned above, it is preferable that the upper order data compression section comprises:

a first coding section that performs such coding processing that numerical values excepting one or a plurality of predetermined compression subject numerical values of the upper order data are directly outputted without any processing, and compression subject numerical values are encoded into the compression subject numerical values and numerical values indicative of a continued number of the same compression subject numerical values as the compression subject numerical values, and a second coding section that applies entropy coding to data subjected to coding by the first coding section using a table for associating codes with numerical values.

In the data compression apparatus according to the present invention as mentioned above, it is acceptable that the upper order data compression section comprises:

a first coding section that performs such coding processing that numerical values excepting one or a plurality of predetermined compression subject numerical values of the upper order data are directly outputted without any processing, and compression subject numerical values are encoded into the compression subject numerical values and numerical values indicative of a continued number of the same compression subject numerical values as the compression subject numerical values, and a second coding section that applies Huffman coding to data subjected to coding by the first coding section using a Huffman table.

In the data compression apparatus according to the present invention as mentioned above, it is preferable that the upper order data compression section comprises:

a first coding section that performs such coding processing that numerical values excepting one or a plurality of predetermined compression subject numerical values of the upper order data are directly outputted without any processing, and compression subject numerical values are encoded into the compression subject numerical values and numerical values indicative of a continued number of the same compression subject numerical values as the compression subject numerical values;

a histogram computing section that determines a histogram of numerical values appearing on data subjected to coding by the first coding section;

a code allocating section that allocates shorter codes in code length as higher numerical values in frequency of occurrence to a table for associating codes with numerical values in accordance with the histogram determined in the histogram computing section; and a second coding section that applies entropy coding to data subjected to coding by the first coding section using the table subjected to a code allocation by the code allocating section.

In the data compression apparatus according to the present invention as mentioned above, it is preferable that the lower order data compression section applies entropy coding to the lower order data using a table for associating codes with numerical values.

In the data compression apparatus according to the present invention as mentioned above, it is acceptable that the lower order data compression section applies Huffman coding to the lower order data using a Huffman table.

In the data compression apparatus according to the present invention as mentioned above, it is preferable that the lower order data compression section outputs the lower order data with non-compression in accordance with an instruction of compression omission.

To achieve the above-mentioned object, the present invention provides a data compression program storage medium storing a data compression program, which causes an information processing apparatus to operate as a data compression apparatus that applies a data compression processing to data to be compressed, in which a two-dimensional image is represented by a succession of numerical values represented by a predetermined number of unit bits, the data compression apparatus comprising:

a thinning processing section that periodically thins numerical values from the succession of numerical values constituting compressed data so as to create a first compressed data consisting of a succession of numerical values derived from thinned compressed data, and a second compressed data consisting of a succession of remained numerical values;

a reversible compression section that applies reversible compression processing to the first compressed data created thinning processing section;

a detecting section that detects an edge portion of the image; and a non-reversible compression section that provides such processing that when the detecting section detects no edge portion on the numerical values constituting the second compressed data created in the thinning processing section, the non-reversible compression section outputs a predetermined code of a number of bits that is less than the predetermined number of unit bits, when the detecting section detects the edge portion, the non-reversible compression section outputs, on a numerical value that is involved in a predetermined positional relation on the image with the numerical values constituting the first compressed data, a numerical value in which the numerical value involved in the predetermined positional relation is expressed by a first number of bits that is less than the predetermined number of unit bits, and the non-reversible compression section outputs, on a numerical value that is not involved in the predetermined positional relation on the image with the numerical values constituting the first compressed data, a numerical value in which the numerical value not involved in the predetermined positional relation is expressed by a second number of bits that is less than the first number of bits.

With respect to the data compression program storage medium of the present invention, only the basic aspects are disclosed here. It is noted, however, that the data compression program storage medium of the present invention include not only the basic aspects, but also various aspects corresponding to the above-mentioned aspects of the data compression apparatus.

With respect to the structural elements such as the thinning processing section constituting the data compression program related to the present invention, it is acceptable that function of one structural element is implemented by one program part, function of one structural element is implemented by a plurality of program parts, or alternatively functions of a plurality structural elements are implemented by one program part. Further, it is acceptable that those structural elements are executed by oneself or by instruction to another program or program parts incorporated into a computer.

BRIEF DESCRIPTION OF THE DRAWINGS

FIG. 15 is a view useful for understanding an example of the Huffman table.

FIG. 16 is a view useful for understanding a coding system to 4 bits code.

DETAILED DESCRIPTION OF PREFERRED EMBODIMENTS

Embodiments of the present invention will be described with reference to the accompanying drawings.

Figure 1:
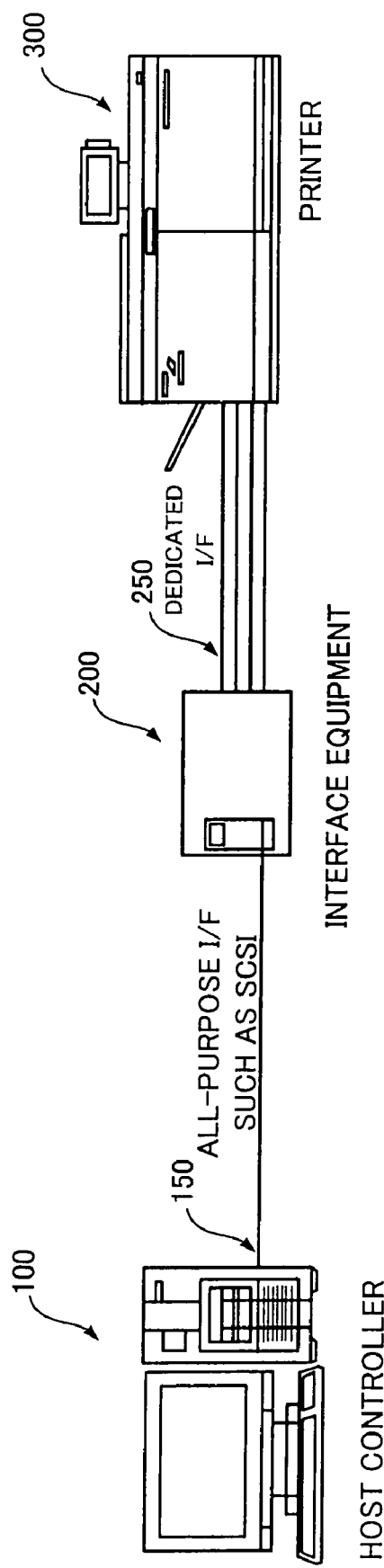
FIG. 1 is a view useful for understanding an example of a print system to which a data compression technology is applied.

The embodiments of the present invention relate to an image compression apparatus that is to be incorporated into the host controller 100 of the overall system shown in FIG. 1. More specifically, the image compression apparatus performs a data compression for bit map data 12A (FIG. 2) of CT in the host controller. Accordingly, it is understood that the data compression processing on the CT data, which were explained referring to FIG. 1 and FIG. 2, are replaced by a data compression processing according to the embodiments of the present invention, which will be explained herein after, and also the data expansion (thawing) processing in an interface equipment is replaced by the data expansion (thawing) processing associated with the data compression processing according to the embodiments of the present invention, and thus the redundant explanations on the overall system shown in FIG. 1 and the flow of the processing shown in FIG. 2 will be omitted.

Figure 3:
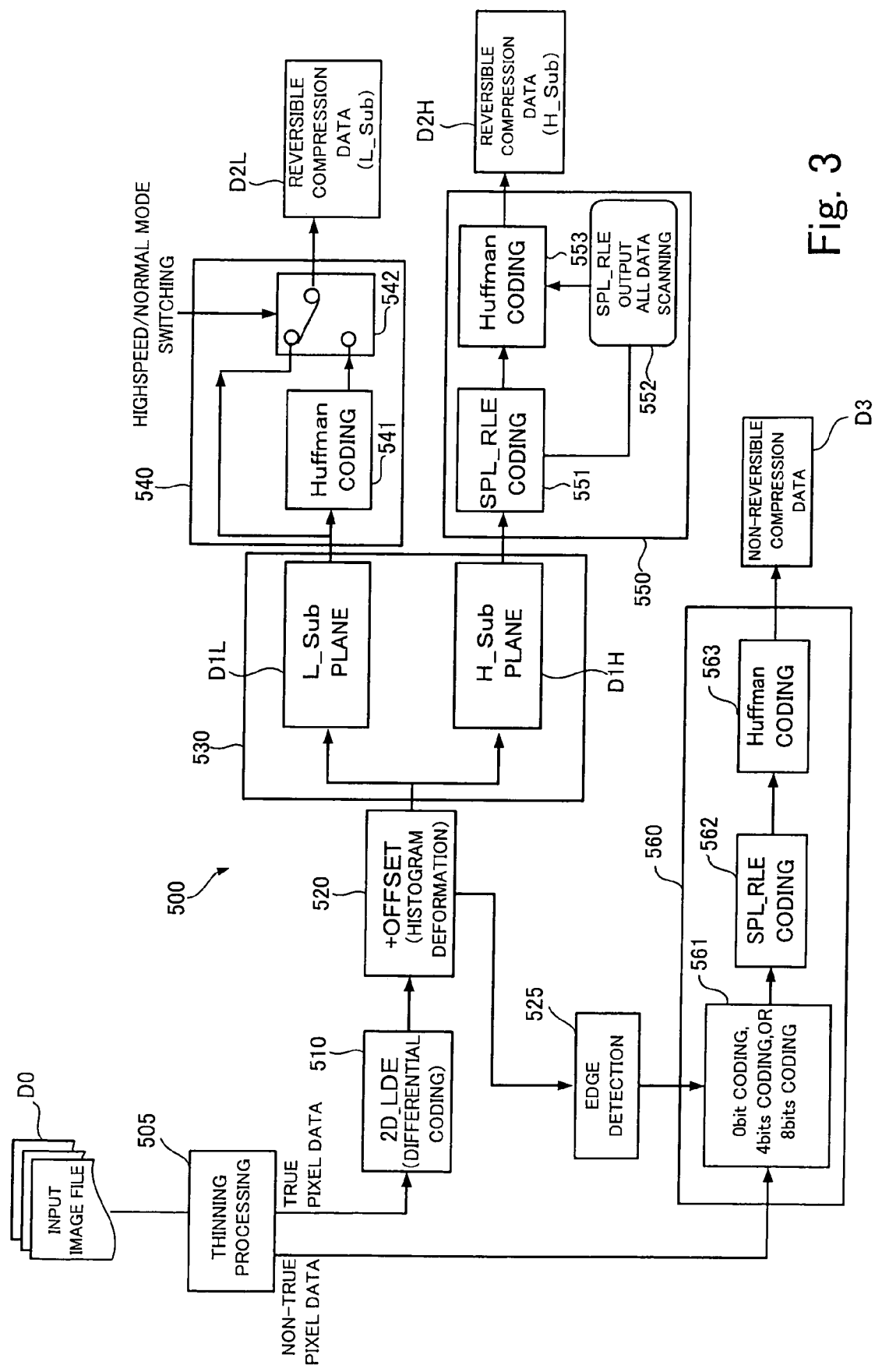
FIG. 3 is a block diagram of an image compression apparatus corresponding to an embodiment of a data compression apparatus of the present invention.

FIG. 3 is a block diagram of an image compression apparatus corresponding to an embodiment of a data compression apparatus of the present invention.

An data compression apparatus 500 shown in FIG. 3 comprises a thinning processing section 505, a differential coding section 510, an offset section 520, an edge detection section 525, a plane division section 530, an L-plane compression section 540, an H-plane compression section 550, and a non-TRUE pixel compression section 560. Details of the respective sections 505 to 560 will be described later. Hereinafter, a flow of image data in the data compression apparatus 500 will be described.

Figure 2:
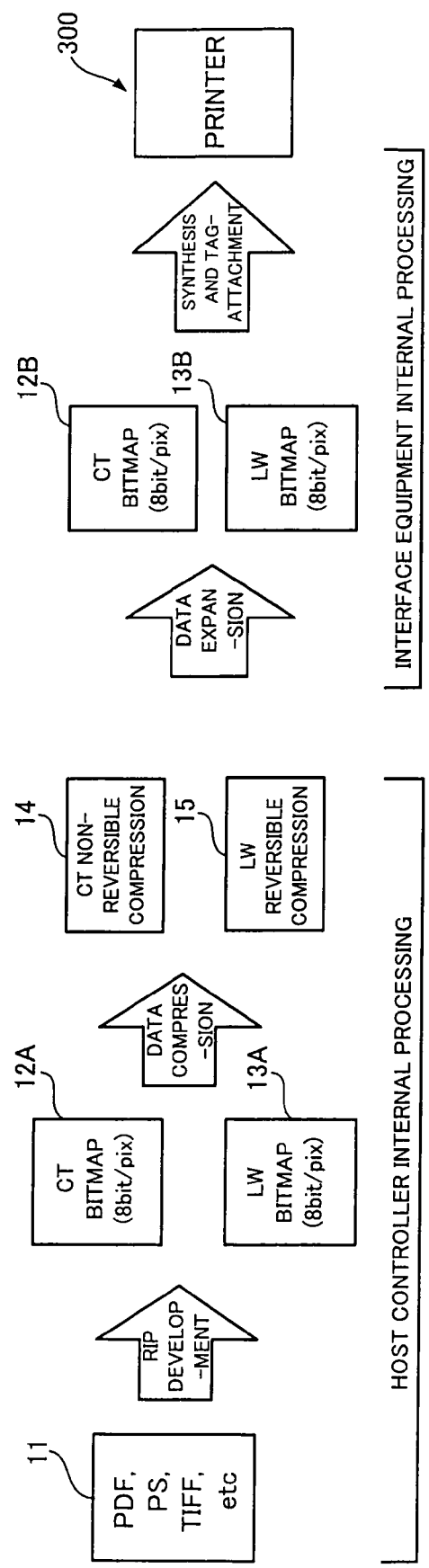
FIG. 2 is a view useful for understanding a data processing in the print system.

An input image file data (according to the present embodiment, it corresponds to a file for storing the CT data 12A, which is developed into a bit map, as shown in FIG. 2), is fed to the thinning processing section 505 of the data compression apparatus 500 shown in FIG. 3 so that TRUE pixel data, which corresponds to a periodical pixel portion of the image, is thinned from the image data. The remains after thinning offer non-TRUE pixel data. The TRUE pixel data corresponds to an example of the first compressed data referred to in the present invention. The non-TRUE pixel data corresponds to an example of the second compressed data referred to in the present invention.

The TRUE pixel data is fed to the differential coding section 510 to perform a two-dimensional differential coding processing in which as to a succession of numerical values constituting input data, there is determined a two-dimensional difference based on a plurality of numerical values each adjacent to the associated numerical value in a plurality of directions looking on an image, so that image data consisting of a succession of 8 bits of numerical values representative of the difference is created. The differential coding section 510 corresponds to an example of the difference creating section referred to in the present invention.

The image data consisting of a succession of numerical values representative of the difference, which is created in the differential coding section 510, is fed to the offset section 520 so as to be offset by a predetermined value. And thereafter, the image data is fed to the edge detection section 525 and the plane division section 530. The edge detection section 525 detects an edge portion of the image in accordance with the differential subjected to the offset. The plane division section 530 divides 8 bits of numerical value of the image data into 4 bits in the lower order of unit bit and 4 bits in the upper order of unit bit, so that the image data is divided into a lower order sub-plane D1L consisting of a succession of numerical values of 4 bits in the lower order of unit bit and an upper order sub-plane D1H consisting of a succession of numerical values of 4 bits in the upper order of unit bit. The offset section 520 corresponds to an example of the offset section referred to in the present invention. The edge detection section 525 corresponds to an example of the detecting section referred to in the present invention. The plane division section 530 corresponds to an example of the dividing section referred to in the present invention. The lower order sub-plane D1L and the upper order sub-plane D1H correspond to examples of the lower order data and the upper order data referred to in the present invention, respectively.

The lower order sub-plane D1L and the upper order sub-plane D1H, which are divided by the plane division section 530, are fed to the L-plane compression section 540 and the H-plane compression section 550, respectively, so as to be subjected to the reversible compression. The L-plane compression section 540 and the H-plane compression section 550 correspond to examples of the lower order data compression section and the upper order data compression section referred to in the present invention, respectively.

A Huffman coding section 541 of the L-plane compression section 540 performs coding processing in which numerical values constituting the lower order sub-plane D1L fed to the Huffman coding section 541 are replaced with codes according to a Huffman table that associates numerical values with codes, in accordance with the Huffman table. The Huffman coding is a sort of the entropy coding. The L-plane compression section 540 incorporates therein a mode switching section 542. The mode switching section 542 switches modes between a normal mode involving the Huffman coding by the Huffman coding section 541 and a high speed mode omitting the Huffman coding and directly outputting the lower order sub-plane D1L, in accordance with a user's instruction of the high speed mode and the normal mode. The L-plane compression section 540 outputs lower order compressed data D2L in which the lower order sub-plane D1L is compressed. In case of the high speed mode, however, the lower order compressed data D2L is the lower order sub-plane D1L.

On the other hand, the H-plane compression section 550 comprises a run length coding section 551, a data scanning section 552, and a Huffman coding section 553. The upper order sub-plane D1H is fed to the run length coding section 551.

The run length coding section 551 detects, first, the presence of one or a plurality of compression object numerical values from among the entered upper order sub-plane D1H, and the continued number of the same compression object numerical values. Next, the run length coding section 551 performs such coding processing that numerical values excepting the compression object numerical values of the upper order sub-plane D1H are directly outputted without any processing, and the compression object numerical values are encoded into the compression object numerical values and numerical values indicative of the continued number of the same compression object numerical values as the compression object numerical values. In order to perform the coding processing, according to the run length coding section 551, there is performed coding of expressing the continued number with a different bit number in accordance with the continued number of the same compression object numerical values. More specifically, for example, the coding is performed in such a manner that in the event that the continued number of the same compression object numerical values is a predetermined number or less, the continued number is expressed by one-unit bit number, and in the event that the continued number of the same compression object numerical values exceeds the predetermined number, the continued number is expressed by two-unit bit number. According to the present embodiment, the run length coding section 551 corresponds to an example of the first coding section referred to in the present invention.

Data after coding by the run length coding section 551 is fed to both the data scanning section 552 and the Huffman coding section 553. The data scanning section 552 scans all the data subjected to coding by the run length coding section 551 to determine appearance frequency (histogram) of all numerical values appearing in the data. According to the present embodiment, processing of determining the appearance frequency is performed taking every one of the upper order sub-plane D1H shown in FIG. 3 as unit, so that the appearance frequency of the numerical values in the data, which is subjected to coding by the run length coding section 551, of the respective upper order sub-plane D1H is determined. The data scanning section 552 assigns the Huffman table the shorter code in code length as the higher numerical value in appearance frequency is concerned with, in accordance with the determined data histogram (appearance frequency of numerical values). The data scanning section 552 corresponds to one serving both as examples of the histogram computing section and the code assigning section referred to in the present invention.

The Huffman table, in which the data scanning section 552 assigns codes to the numerical values, is transferred to the Huffman coding section 553. The Huffman coding section 553 performs coding processing in which numerical values constituting the data fed to the Huffman coding section 553 are replaced with codes according to the Huffman table, that is, codes expressed by the shorter bit length as the higher numerical values in appearance frequency is concerned, in accordance with the Huffman table. The Huffman coding section 553 corresponds to an example of the second coding section referred to in the present invention.

Data, which is subjected to the Huffman coding by the Huffman coding section 553, is accompanied with compression information including an allocation table for numerical values and codes assigned by the data scanning section 552, and is outputted from the H-plane compression section 550 in form of upper order compressed data D2H in which the upper order sub-plane D1H is compressed.

Thus, a set of the lower order compressed data D2L and the upper order compressed data D2H, which are outputted from the L-plane compression section 550 and the H-plane compression section 550, respectively, constitutes reversible compressed data in which the TRUE pixel data is reversibly compressed.

On the other hand, the non-TRUE pixel data, which is obtained by the thinning processing section 505, is fed to the non-TRUE pixel compression section 560 so as to be subjected to the non-reversible compression processing. The non-TRUE pixel compression section 560 comprises a bit reduction section 561, a run length coding section 562, and a Huffman coding section 563. Numerical values, which constitute the non-TRUE pixel data, are first fed to the bit reduction section 561. The bit reduction section 561 performs such processing that if a pixel associated with the numerical value does not belong to an edge portion detected by the edge detection section 525, the associated pixel is encoded into 0 bit (the substantial data removal). If the associated pixel belongs to the edge portion, as will be described later, numerical values constituting pixel data of the pixel are replaced with a code of 4 bits or 8 bits in accordance with a location of the pixel in the edge portion.

The run length coding section 562 and the Huffman coding section 563 apply the completely same processing as the processing by the H-plane compression section 550 to the data encoded in the bit reduction section 561. As a result, the non-TRUE pixel compression section 560 outputs the non-reversible compressed data D3 in which the non-TRUE pixel data is compressed on a non-reversible basis.

The reversible compressed data of the TRUE pixel data and the non-reversible compressed data of the non-TRUE pixel data constitute compressed data for the original image data. The compressed data is transferred via a general-purpose interface 150 such as SCSI shown in FIG. 1 to the interface equipment 200. The interface equipment 200 applies a data expansion processing to the received reversible compressed data. In the data expansion processing, there is performed decoding processing associated with the coding processing as explained in conjunction with FIG. 3, so that the same image data as the image data in the original input image file is restored to the original state.

Figure 4:
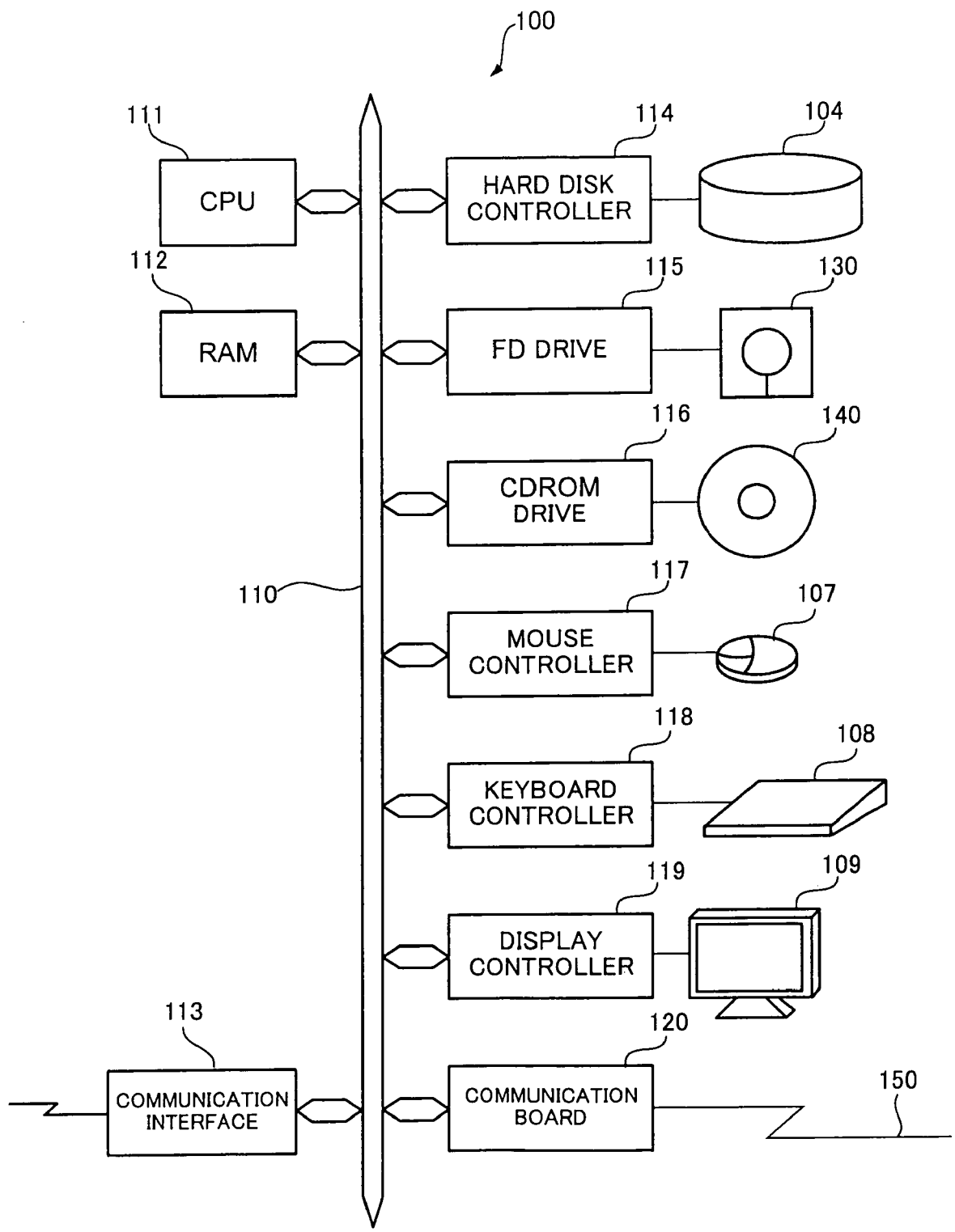
FIG. 4 is a hardware structural view of the host controller shown in FIG. 1.

FIG. 4 is a hardware structural view of the host controller shown in FIG. 1.

A host controller 100 shown in FIG. 1 may be constructed of a computer system of the structure shown in FIG. 4.

The host controller 100, which is constructed of the computer system shown in FIG. 4, comprises a CPU 111, a RAM 112, a communication interface 113, a hard disk controller 114, a flexible disk (FD) drive 115, a CD-ROM drive 116, a mouse controller 117, a keyboard controller 118, a display controller 119, and a communication board 120. These various types of elements are connected via a bus 110 to one another.

The hard disk controller 114 controls an access of a hard disk 104 that is incorporated in the host controller 100. The FD drive 115 and the CD-ROM drive 116 control an access of a flexible disk (FD) 130 and a CD-ROM 140, which are detachably mounted on the host controller 100, respectively. The mouse controller 117 and the keyboard controller 118 serve to detect operations of a mouse 107 and a keyboard 108, respectively, so that a result of the detection is transmitted to the CPU 111. The display controller 119 causes an image to be displayed on a display screen of a display 109 of the host controller 100 in accordance with the instruction of the CPU 111.

The communication board 120 has a function of a communication based on an all-purpose interface protocol such as SCSI, and serves to transmit the compressed image data via the interface cable 150 to the interface equipment 200.

The communication interface 113 serves to perform a communication via all-purpose network such as Internet. The host controller 100 receives image data via the communication interface 113.

The RAM 112 reads a program stored in the hard disk 104 to develop the program for the purpose of execution by the CPU 111. The CPU 111 reads the program developed in the RAM 112 and executes the same.

Figure 5:
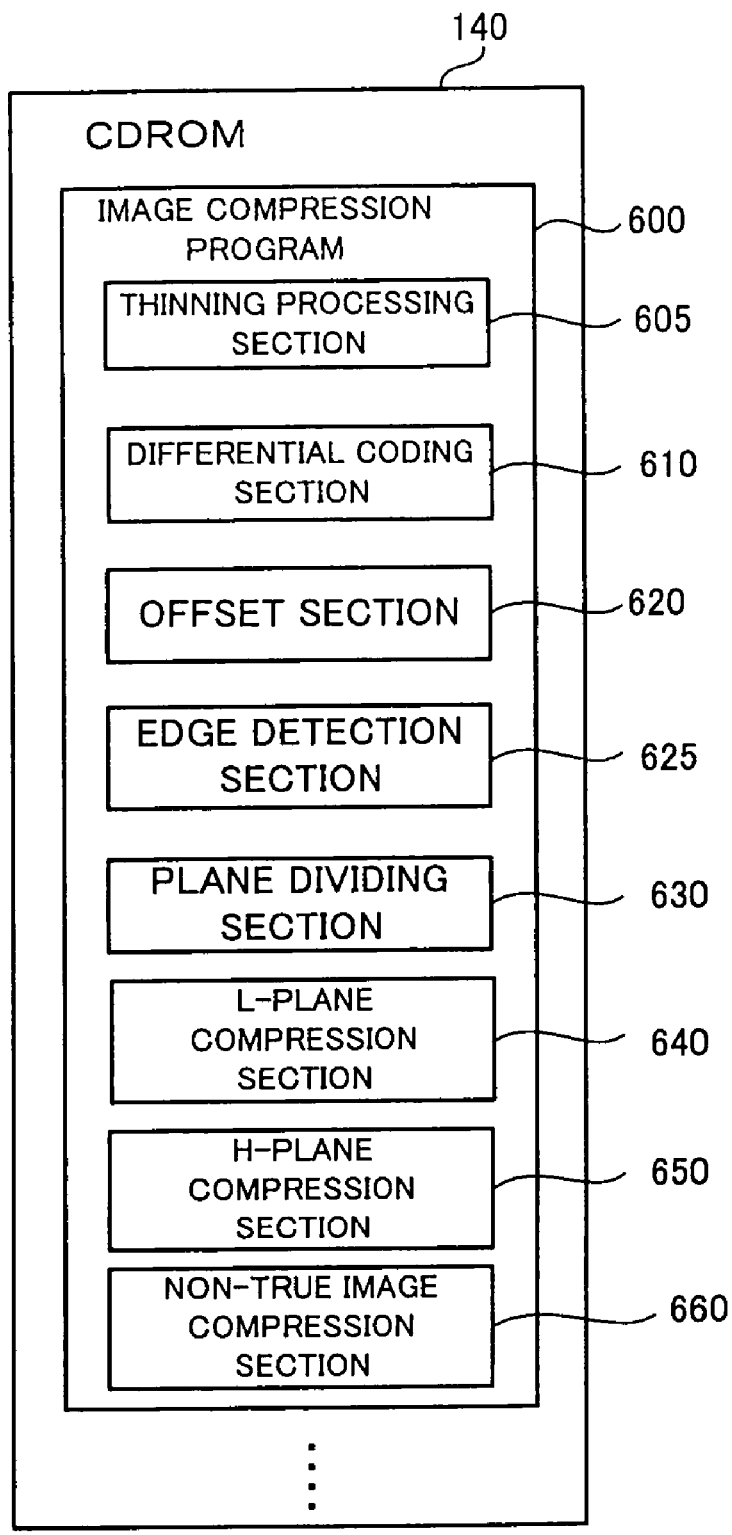
FIG. 5 is a typical structural view of an image compression program corresponding to an embodiment of a data compression program stored in a data compression program storage medium of the present invention.

FIG. 5 is a typical structural view of an image compression program corresponding to an embodiment of a data compression program stored in a data compression program storage medium of the present invention.

An image compression program 600 is stored in the CD-ROM 140.

The image compression program 600 comprises a thinning processing section 605, a differential coding section 610, an offset section 620, an edge detection section 625, a plane division section 630, an L-plane compression section 640, an H-plane compression section 650, and a non-TRUE pixel compression section 660. The CD-ROM 140 stores therein various sorts of programs for executing a series of processing in the host controller 100 shown in FIG. 1, as well as the data compression program 600. Those programs are the same as the conventional one, and thus the redundant explanation will be omitted.

When the CD-ROM 140 shown in FIG. 5 is mounted on the host controller 100 shown in FIG. 4 so as to be accessed by the CD-ROM drive 116, the programs stored in the CD-ROM 140 is up-loaded on the host controller 100 and is stored in the hard disk 104. Thus, the program stored in the hard disk 104 is read from the hard disk 104 and is developed in the RAM 112. When the CPU 111 executes the developed program, the host controller 100 operates as an apparatus for executing various sorts of processing as the host controller, including processing as the data compression apparatus 500 shown in FIG. 3.

Here, when the image compression program 600 shown in FIG. 5 is installed in the host controller 100 and is executed in the CPU 111, the image compression program 600 implements the data compression apparatus 500 shown in FIG. 3 in the host controller 100. When the CPU 111 executes the thinning processing section 605, the differential coding section 610, the offset section 620, the edge detection section 625, the plane division section 630, the L-plane compression section 640, the H-plane compression section 650, and the non-TRUE pixel compression section 660, those sections serve as program parts that cause the host controller 100 to operate as the thinning processing section 505, the differential coding section 510, the offset section 520, the edge detection section 525, the plane division section 530, the L-plane compression section 540, the H-plane compression section 550, and the non-TRUE pixel compression section 560, respectively, which constitute the data compression apparatus 500 shown in FIG. 3. That is, those program parts substantially construct the structural elements of the on data compression apparatus 500 on the host controller 100.

Functions of the sections 605 to 660 that constitute the image compression program 600 shown in FIG. 5, wherein those sections 605 to 660 are executed in the CPU 111, are the completely same as functions of the sections 505 to 560 that constitute the data compression apparatus 500 shown in FIG. 3, respectively. Accordingly, the above-mentioned explanation as to the sections 505 to 560 of the data compression apparatus 500 shown in FIG. 3 and the detailed explanation, which will be described later, may serve as the explanation for the sections 605 to 660 that constitute the image compression program 600 shown in FIG. 5.

Figure 6:
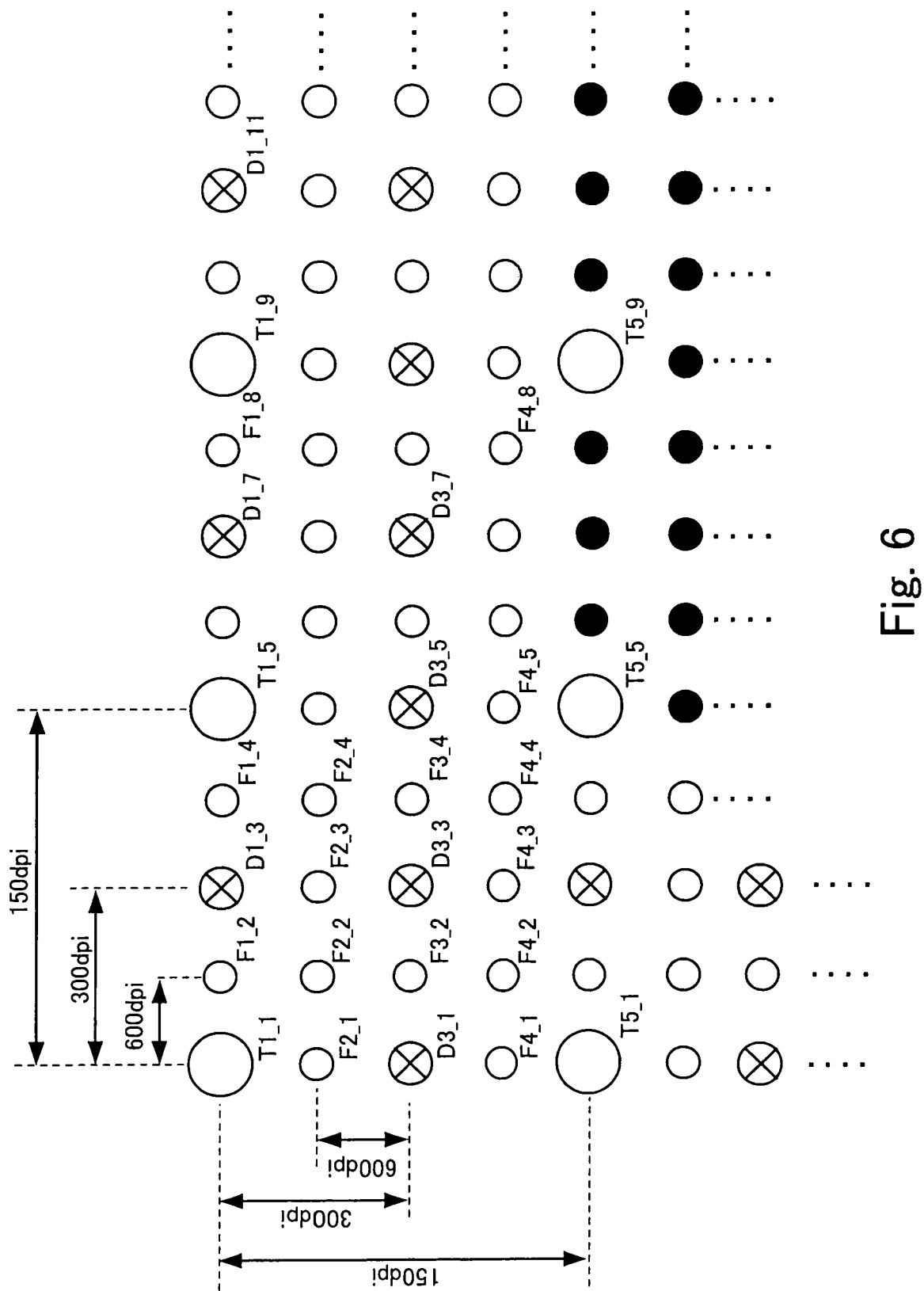
FIG. 6 is a view useful for understanding a data structure of image data of an input image file to be entered into the data compression apparatus shown in FIG. 3 and a concept of the thinning processing.

FIG. 6 is a view useful for understanding a data structure of image data of an input image file to be entered into the data compression apparatus 500 shown in FIG. 3 and a concept of the thinning processing.

As shown in FIG. 6, the image data, which is to be entered to the data compression apparatus 500 shown in FIG. 3, consists of pixels arranged in a predetermined main scanning direction (the horizontal direction of the figure), and pixels arranged in a sub-scanning direction (the vertical direction of the figure), which is perpendicular to the main scanning direction (the horizontal direction of the figure). A row of pixels arranged in the main scanning direction is addressed as a line. Here, 6 lines of pixels are shown. An interval between the pixels corresponds to resolution of 600 dpi.

A position of the respective pixel is expressed with a suffix applied to codes T, F and D representative of pixel values. For example, with respect to the third line, the pixel values of the individual pixels arranged in the main scanning direction are applied with the following suffixes in the order of the arrangement.

3_1, 3_2, 3_3, 3_4, 3_5, . . .

The thinning processing section 505, which constitutes the data compression apparatus 500 shown in FIG. 3, receives the image data consisting of pixel values as mentioned above and classifies the individual pixels into two sorts of pixels of the TRUE pixels and the non-TRUE pixels (for example, FAKE pixel and pseudo TRUE pixel, which will be described later). Of the pixels shown in FIG. 6, the TRUE pixel is expressed by code T in the pixel value, the FAKE pixel is expressed by code F in the pixel value, and the pseudo TRUE pixel is expressed by code D in the pixel value. Further, FIG. 6 shows pixels represented by the mark "●". With respect to the FAKE pixel, the pseudo TRUE pixel, and the pixel represented by the mark "●", details of those pixels will be described later in conjunction with the explanation of the non-reversible compression. Hereinafter, there will be described the TRUE pixels.

The TRUE pixel is a pixel which is periodically thinned from among the arranged pixels. According to the present embodiment, by way of example, on each line every fourth lines in the sub-scanning direction, individual pixels every fourth pixels in the main scanning direction are thinned as the TRUE pixel. As a result, according to the example shown in FIG. 6, the TRUE pixels correspond to the pixels constituting an image wherein the resolution is lowered from 600 dpi to 150 dpi. This means that pixels corresponding to one-sixteenth of the original image data are thinned. Thus thinned TRUE pixels constitute TRUE pixel data consisting of a succession of the TRUE pixels as mentioned above, and the structure of the TRUE pixel data offers, in a similar fashion to the original image data, such a structure that pixel values of the individual pixels are arranged in the main scanning direction and the sub-scanning direction.

With respect to a way of thinning the TRUE pixels, it is possible to adopt, for example, another system in which a period of thinning is different between the main scanning direction and the sub-scanning direction. Hereinafter, there will be explained the example in which the pixels arranged every fourth lines are thinned, as shown in FIG. 6.

The TRUE pixel data, which is obtained from the TRUE pixels thinned in the manner as mentioned above, is fed to the differential coding section 510 of the data compression apparatus 500 shown in FIG. 3 so as to be subjected to two-dimensional differential coding processing.

Next, there will be explained the two-dimensional differential coding processing.

Figure 7:
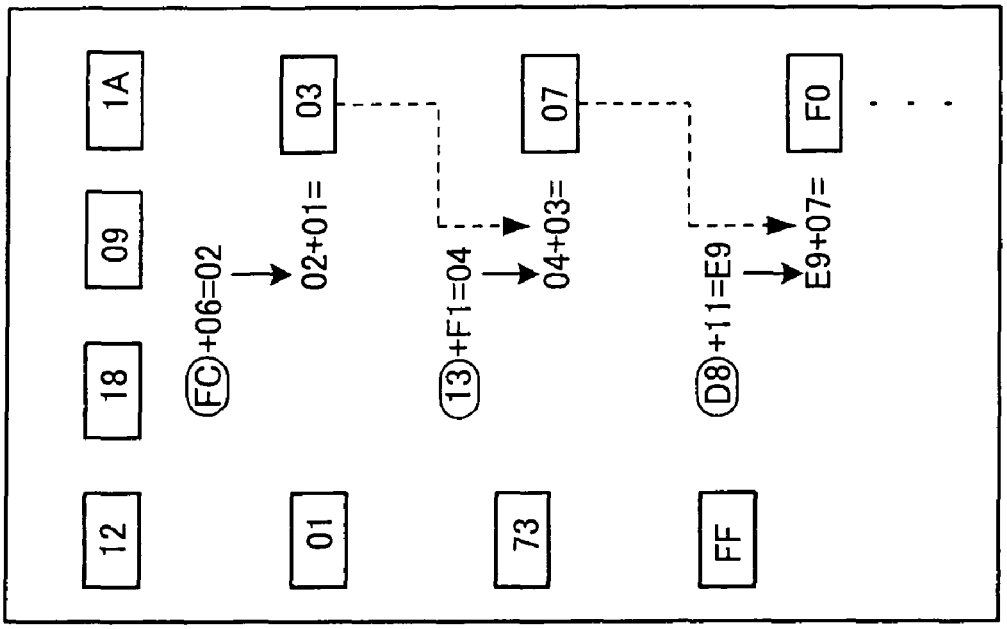
FIG. 7 is a view useful for understanding an example of a two-dimensional differential coding processing in the differential coding section constituting the data compression apparatus shown in FIG. 3.
Figure 7:
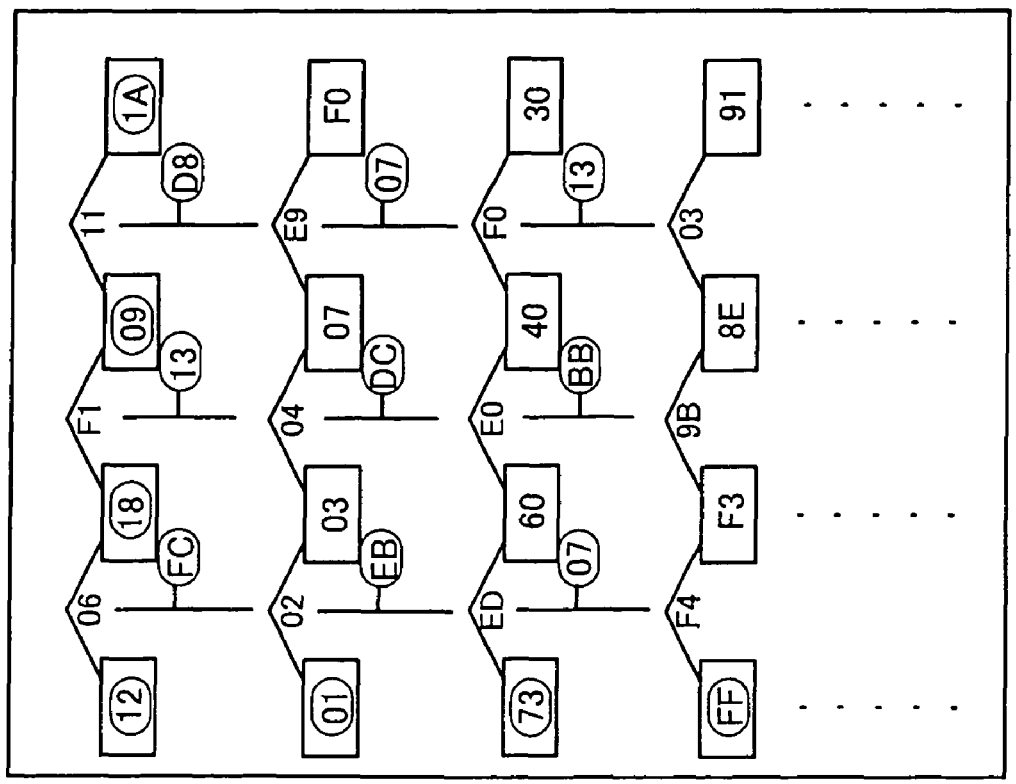

FIG. 7 is a view useful for understanding an example of the two-dimensional differential coding processing in the differential coding section 510 constituting the data compression apparatus 500 shown in FIG. 3.

Of the numerical values shown in part (A) of FIG. 7, the numerical values "12, 18, 09, . . . 01, 03, 07, F0 . . . ", which are encircled with a square, denote pixel values constituting the image data, and the numerical values "12, 18, 09, 1A . . . 01, FC, 15, D8 . . . ", which are encircled with a circle, denote output values to be outputted through the two-dimensional differential coding processing. In the following explanation, the pixels arranged in the main scanning direction (the horizontal direction of the figure) are addressed as a "line".

In the two-dimensional differential coding processing, first, with respect to the pixel values "12, 18, 09, 1A . . . " on the first line, those values are outputted directly without any processing. And differences "18–12=06", "09–18=F1", . . . between the individual adjacent pixel values in the main scanning direction are computed. For example, a result of the subtraction of "09"–"18" is the negative number, and it is expressed by "1F1" in 9 bits. Here, "1", which is one bit of the MSB (Most Significant Bit), is omitted, and only "F1", which is 8 bits in the lower order of unit bit, is outputted.

Next, with respect to the second line, only the first pixel value "01" is outputted as it is, and differences "03–01=02", "07–03=04", . . . between the individual adjacent pixel values in the main scanning direction are computed. Further individual differences between the differences "06, EF, 11 . . . " on the first line and the differences "02, 04, E9 . . . " on the second line are determined in form of "02–06=FC", "04–EF=13", . . . , and then outputted.

Next, with respect to the third line too, processing is carried out in a similar fashion to that of the second line. That is, only the first pixel value "73" on the third line is outputted as it is, and differences "60–73=ED", "40–60=ED", . . . between the individual adjacent pixel values in the main scanning direction are computed. Further individual differences between the differences "02, 04, E9 . . . " on the second line and the differences "ED, E0, F0 . . . " on the third line are determined in form of "ED–02=EB", "E4–04=DC", . . . , and then outputted.

This operation is repeated to output the numerical values encircled in FIG. 7, as set forth below.

"12 18 09 1A . . . 01 FC 15 D8 . . . 73 EB DC 07 . . . FF 07 BB 13 . . . "

To decode the differential encoded data as mentioned above, the interface equipment 200 shown in FIG. 1 performs an operation as shown in the right side (a part (B)) of FIG. 7.

First, individual pixel values "12 18 09 1A . . . " on the first line are left as it is.

Individual first pixel values "01" "73" "FF" . . . on each line of the second line and those following are left as it is.

Here, by way of example, the second and those following differentials "FC 15 D8 . . . " on the second line are raised and there will be explained, a procedure of decoding the original pixel values from the differentials.

In order to perform decoding of the pixel values, there are used three pixel values, as to the object pixel, for three pixels of a pixel on the preceding position (the left side of the figure) on the associated line, a pixel on the same position on the preceding line (the upper side of the figure), and a pixel on the preceding position of the preceding line.

With respect to the differential "FC" of the second pixel on the second line, there are used the pixel value "12" of the first pixel on the first line, the pixel value "18" of the second pixel on the first line, and the pixel value "01" of the first pixel on the second line to determine the difference between the pixel value "18" of the second pixel on the first line and the pixel value "12" of the first pixel on the first line, that is, "18–12=06". The difference "06" is added to the differential "FC" of the object to obtain a result. Thus, there is obtained "02" which is expressed with 8 bits in the lower order of unit bit, of the result. The pixel value "01" of the first pixel on the second line is added to the value "02" to obtain a result. Thus, "03", which is expressed with 8 bits in the lower order of unit bit, of the result, is decoded in form of the second pixel value on the second line.

With respect to the third pixel value on the second line, the difference "09–18=F1" between the third pixel value and the second pixel value on the first line is added to the differential value "13" to obtain a result. Thus, there is obtained "04", which is expressed with 8 bits in the lower order of unit bit, of the result. Further, the second pixel value "03" on the second line is added to the value "04" to obtain a result. Thus, the third pixel value on the second line is "07", which is expressed with 8 bits in the lower order of unit bit, of the result.

With respect to the fourth pixel value on the second line, the difference "1A–09=11" between the fourth pixel value and the third pixel value on the first line is added to the differential value "D8" to obtain a result. Thus, there is obtained "E9", which is expressed with 8 bits in the lower order of unit bit, of the result. Further, the third pixel value "07" on the second line is added to the value "E9" to obtain a result. Thus, the fourth pixel value on the second line is "F0", which is expressed with 8 bits in the lower order of unit bit, of the result.

Hereinafter, this operation is repeated to decode the differential values to the pixel values before the two-dimensional differential encoding.

According to the differential coding section 510 in FIG. 3, as explained above, the two-dimensional differential encoding is applied to the image data. Data obtained through the two-dimensional differential encoding is fed to the offset section 520 of FIG. 3 so that a predetermined offset value is added to the individual numerical values of the data.

With respect to effects of the two-dimensional differential encoding and the offset, it will be explained, by way of example, using image data of CT, hereinafter.

Figure 8:
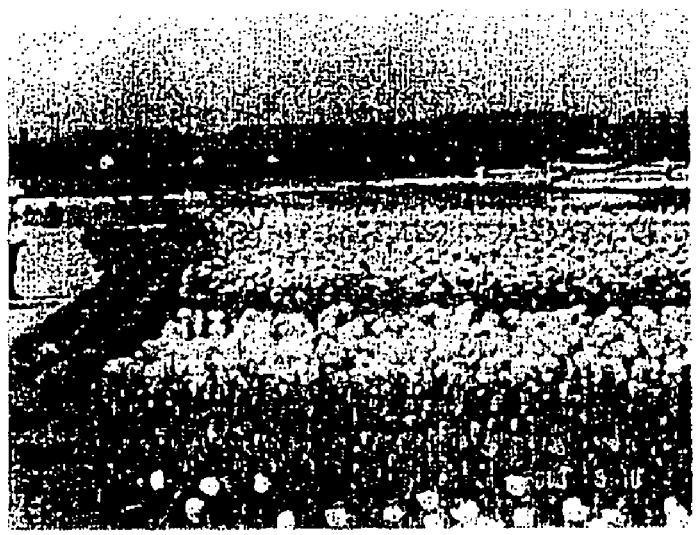
FIG. 8 is an explanatory view useful for understanding an example of image data of CT.
Figure 8:
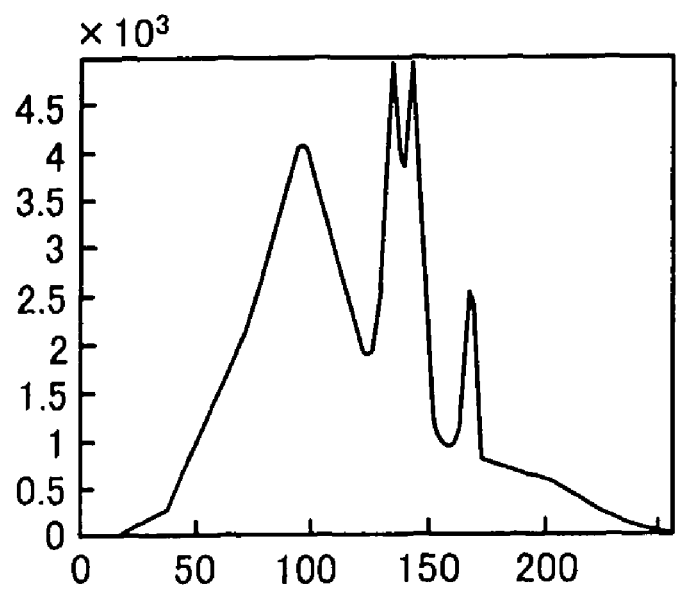

FIG. 8 is an explanatory view useful for understanding an example of image data of CT.

A part (A) of FIG. 8 shows a landscape image of monochrome by way of an example of CT image represented by image data of CT. According to the present embodiment, there is used image data in which density of colors in individual pixels of the CT image is expressed by 8 bits of numerical value. A part (B) of FIG. 8 shows a histogram of data values in the image data representative of the landscape image shown in the part (A) of FIG. 8. The horizontal axis of the histogram denotes data values. The vertical axis of the histogram denotes data number (the number of pixels). Regarding the CT image, generally, the histogram is wide in width, and even if ups and downs on the data number occur in the histogram, it is extremely rare that an area of the data number "0" occurs in the histogram.

Figure 9A:
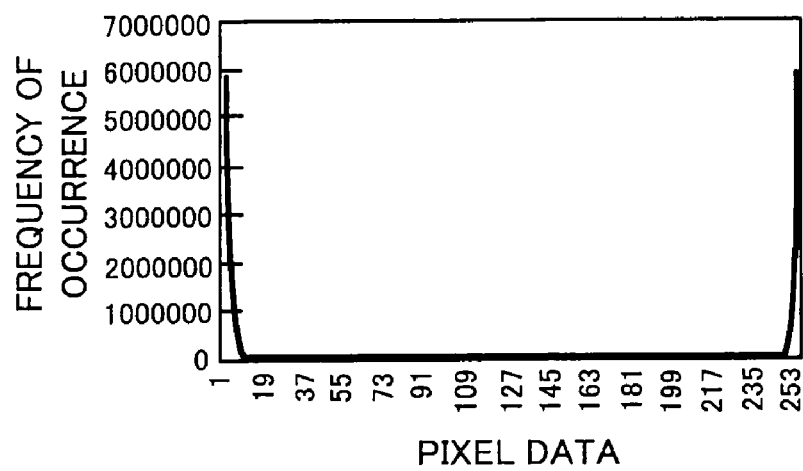
FIG. 9 is a view useful for understanding effects of the two-dimensional differential coding and offset to image data of CT.
Figure 9B:
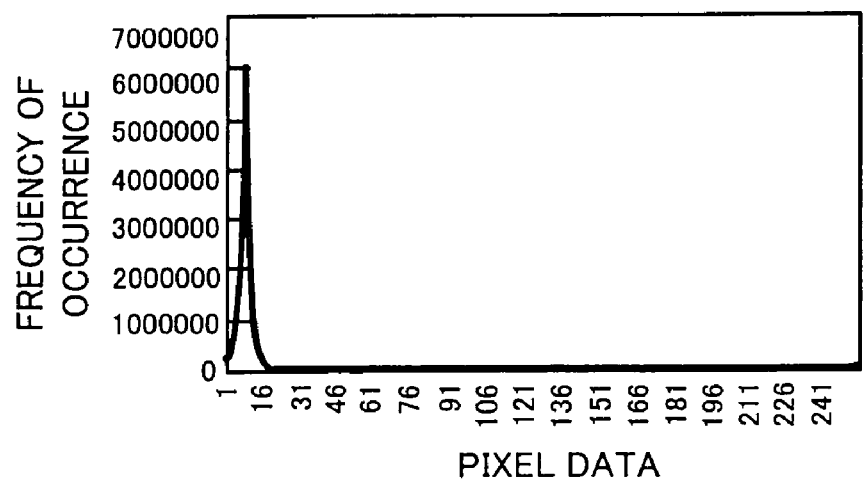

FIG. 9 is a view useful for understanding effects of the two-dimensional differential coding and offset to image data of CT.

A part (A) of FIG. 9 shows a histogram of data which is obtained by means of applying the differential coding to the image data of CT shown in FIG. 8. The horizontal axis of the histogram denotes data values. The vertical axis of the histogram denotes frequency of occurrence. When the differential coding, which is explained in conjunction with FIG. 7, is applied to the image data of CT, the histogram of the data generally offers a histogram having sharp peaks on both the minimum data value and the maximum data value, as shown in the part (A) of FIG. 9. When the offset is applied to the data, the histogram of the data offers a histogram having a sharp peak on the offset value, as shown in the part (B) of FIG. 9. According to the present embodiment, the offset value "8" is used, and frequency of data exceeding the value "16" as a result of the offset offers nearly "0".

Thus, data, which is deformed in histogram by the differential coding and the offset, is divided by the plane divisional section 530 in FIG. 3 into the lower order sub-plane and the upper order sub-plane.

Figure 10:
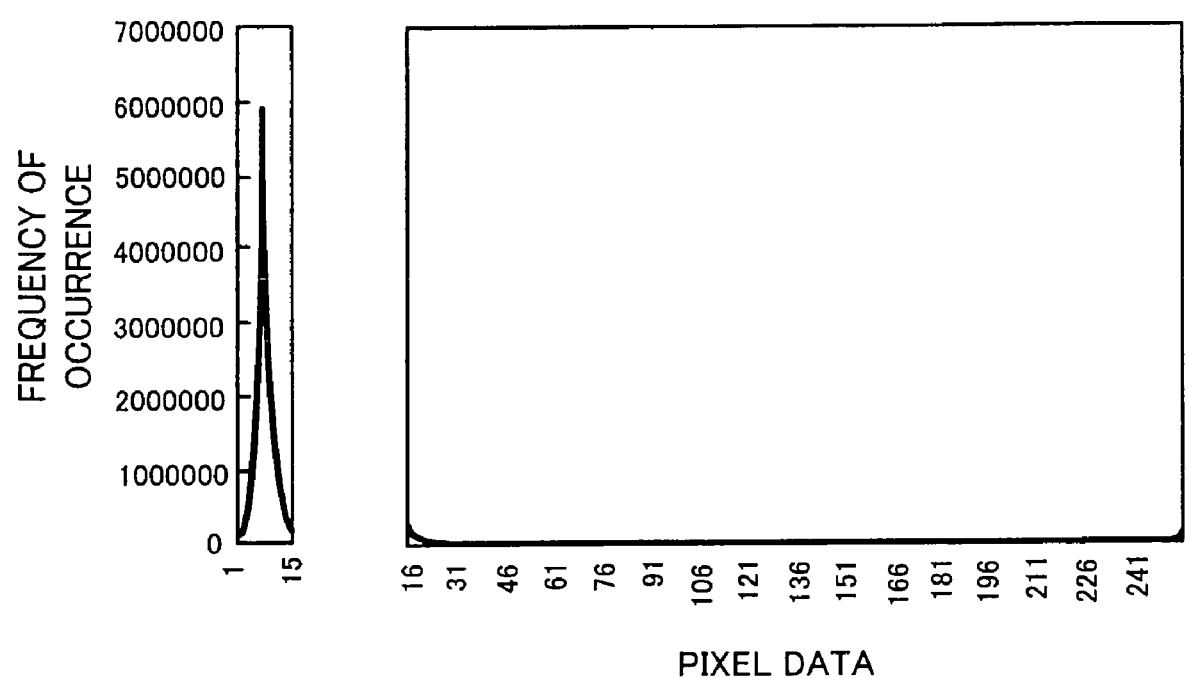
FIG. 10 is an explanatory view useful for understanding effects of data division by a plane divisional section.

FIG. 10 is an explanatory view useful for understanding effects of data division by a plane divisional section.

FIG. 10 shows a histogram in which the histogram shown in the part (B) of FIG. 9 is divided between the data value "15" and the data value "16". A data division by the plane divisional section 530 in FIG. 3 brings about an effect corresponding to the division of the histogram as mentioned above. Specifically, according to the present embodiment, a division of 8 bits of numerical values constituting data into 4 bits in the upper order of unit bit and 4 bits in the lower order of unit bit makes it possible to obtain the lower order sub-plane consisting of a succession of numerical values represented by 4 bits in the lower order of unit bit and the upper order sub-plane consisting of a succession of numerical values represented by 4 bits in the upper order of unit bit. When it is interpreted that 4 bits of numerical values constituting the lower order sub-plane represent the value "0" to the value "15" as it is, and 4 bits of numerical values constituting the upper order sub-plane represent the value "16" to the value "256" at 16 intervals in 16 sorts of numerical value, the histogram of the lower order sub-plane is substantially same as the histogram shown in the left of FIG. 10, and the histogram of the upper order sub-plane is substantially same as the histogram shown in the right of FIG. 10. With respect to the histogram of the upper order sub-plane, however, it is noted that a peak of height, which is equal to an area of the histogram shown in the left of FIG. 10, is appended to a place of the data value "16" of the histogram shown in the right of FIG. 10.

Thus, the upper order sub-plane is fed to the run length coding section 551 of the H-plane compression section 550 shown in the right of FIG. 3.

According to the present embodiment, for the sake of convenience of processing, the run length coding section 551 deals with two sets of continued 4 bits of numerical values constituting the upper order sub-plane as a set of 8 bits of numerical values, and applies the following coding processing to a succession of numerical values from the value "00" to the value "FF" on a base of a hexadecimal number system.

According to the coding processing as mentioned above, the coding processing is carried out for only the specific numerical values of a plurality of 8 bits of numerical values. Hence, the run length coding section 551 detects, from among the received data, numerical values to be subjected to the coding processing (the numerical value is referred to as "compression object numerical value"), and the continued number of the compression object numerical value.

According to the present embodiment, it is assumed that the three numerical values of "01", "FF" and "00" may be designated as the compression subject numerical values.

Figure 11:
FIG. 11 is a view useful for understanding coding in the run length coding section shown in FIG. 3.

FIG. 11 is an explanatory view useful for understanding coding in the run length coding section 551 shown in FIG. 3.

The upper line in FIG. 11 is concerned with data constituting the upper order sub-plane, and the lower line is concerned with data subjected to the coding processing by the run length coding section 551.

Here, as shown in the upper line of FIG. 11, it is assumed that the run length coding section 551 receives the following data.

"06 02 02 02 01 01 01 01 04 05 00 . . ."

In this case, the run length coding section 551 in FIG. 3 detects that the first numerical value "06" is not the compression subject numerical value, the successive numerical value "02 02 02" is also not the compression subject numerical value, the compression subject numerical values "01" continuously occur four times, and the compression subject numerical values "00" continuously occur 32767 times interposing the numerical values "04" and "05", which are not the compression subject numerical values.

Figure 12:
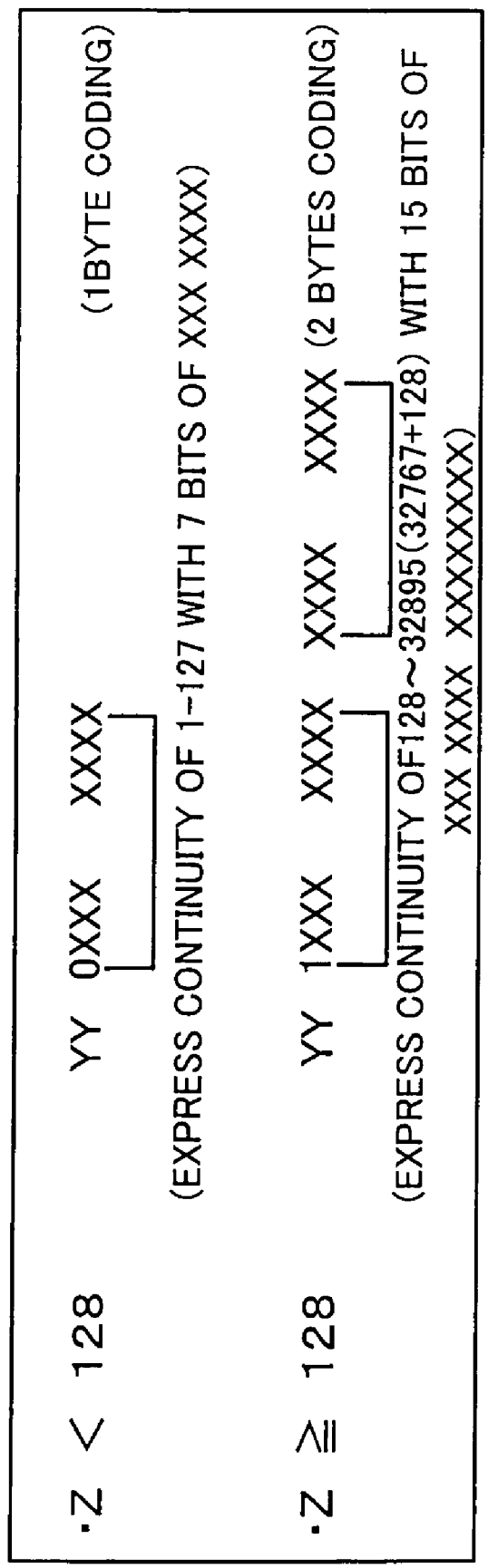
FIG. 12 is a view useful for understanding algorithm of coding for compression subject numerical values in the run length coding section.

FIG. 12 is a view useful for understanding algorithm of coding for compression subject numerical values in the run length coding section.

In FIG. 12, Z denotes a continued number of the same compression subject numerical value, for example, with respect to "01" on the upper line in FIG. 11, Z=4, and with respect to "00", Z=32767.

In FIG. 12, "YY" denotes the compression subject numerical value expressed by the hexadecimal two digits per se. "0" or "1" subsequent to "YY" denotes "0" or "1" expressed with 1 bit, respectively. "XXX XXXX . . ." denotes the value of Z, where one "X" represents 1 bit.

More in detail, in FIG. 12, in the event that the compression subject numerical value "YY" continues Z<128, the compression subject numerical value "YY" is expressed with the first one byte, the first bit is expressed by "0" with the subsequent one byte, and the value of Z is expressed with the subsequent 7 bits. And in the event that the compression subject numerical value "YY" continues z≧128, the compression subject numerical value "YY" is expressed with the first one byte, the first bit of the subsequent 2 bytes (16 bits)

is expressed by "1", so that the coding is expressed with 2 bytes, and the value of Z is expressed with the subsequent 15 bits.

Hereinafter, there will be explained an example of the coding shown in FIG. 11 in accordance with the rule shown in FIG. 12.

Since the first numerical value "06", which constitutes the data of the upper order sub-plane (on the upper line) received from the plane divisional section 530 in FIG. 3, is not the compression subject numerical value, the value "06" is directly outputted. Further, since the subsequent numerical values "02 02 02" are also not the compression subject numerical value, those three values "02" are also directly outputted. Next, since four pieces of compression subject numerical value "01" continue, the values are coded into "01 04". Since the subsequent numerical values "04 05" are not the compression subject numerical value, those values "04" and "05" are directly outputted.

Next, since 32767 pieces of numerical value "00" continue, "00" is established, and the first one bit of the next one byte is expressed by "1" and 32767-128 is expressed with 15 bits, so that three bytes of "00 FF 7F" express that 32767 pieces of "00" continue. That is, the continued number 128 is expressed with "00 00", except for the first bit "1".

Figure 13:
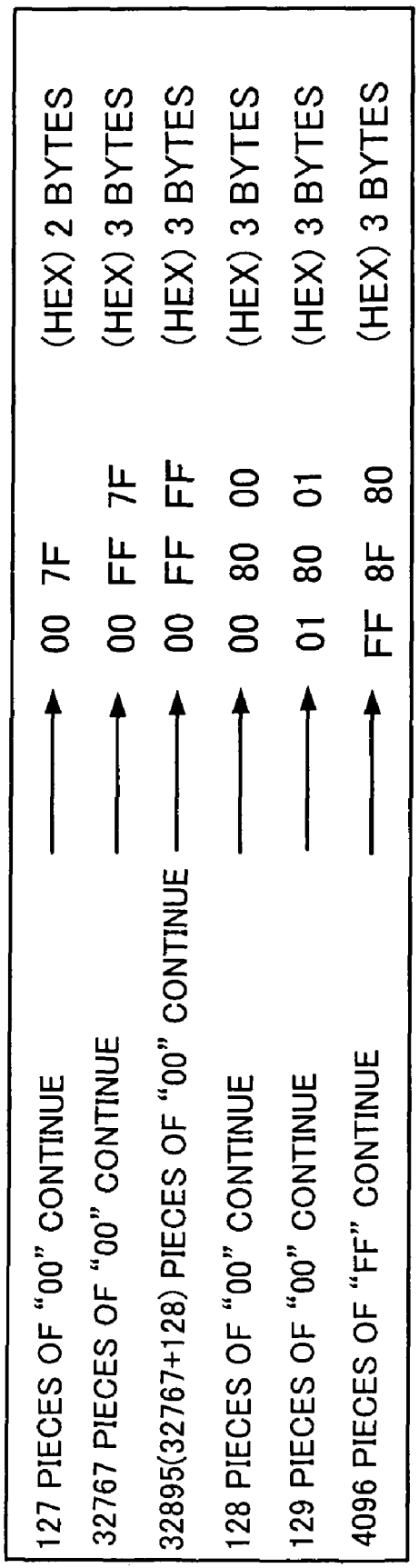
FIG. 13 is an explanatory view useful for understanding an example of the coding processing according to the continued number in the run length coding section shown in FIG. 3.

FIG. 13 is an explanatory view useful for understanding an example of the coding processing according to the continued number in the run length coding section 551 shown in FIG. 3.

When 127 pieces of "00" continue, the use of 2 bytes encodes data to "00 7E".

When 32767 pieces of "00" continue, the use of 3 bytes encodes data to "00 FF 7E".

When 32895 pieces of "00" continue, the use of 3 bytes encodes data to "00 FF FF".

When 128 pieces of "00" continue, the use of 3 bytes encodes data to "00 80 00".

When 129 pieces of "01" continue, the use of 3 bytes encodes data to "01 80 01".

When 4096 pieces of "FF" continue, the use of 3 bytes encodes data to "FF 8F 80".

The run length coding section 551 shown in FIG. 3 performs the coding processing as mentioned above.

According to the run length coding section 551 of the present embodiment, the maximum bulk compressibility is improved to 3/32895=1/10965. With respect to the data of the upper order sub-plane, which is the subject of the coding processing by the run length coding section 551, as mentioned on the histogram of FIG. 10, almost all 4 bits of numerical values offer the numerical value "0" representative of the data value "16", and 8 bits of numerical values, which are generated from the above-mentioned 4 bits of numerical values, also mostly offer the numerical value "00" on a hexadecimal number system basis. Thus, the coding processing by the run length coding section 551 makes it possible to expect a drastic data compression.

The data, which was subjected to the coding processing in the run length coding section 551 in FIG. 3, is fed to the data scanning section 552 and the Huffman coding section 553, which constitute the H-plane compression section 550.

The data scanning section 552 first scans data outputted from the run length coding section 551 in its entirety to determine frequency of occurrence of the data value.

Figure 14:
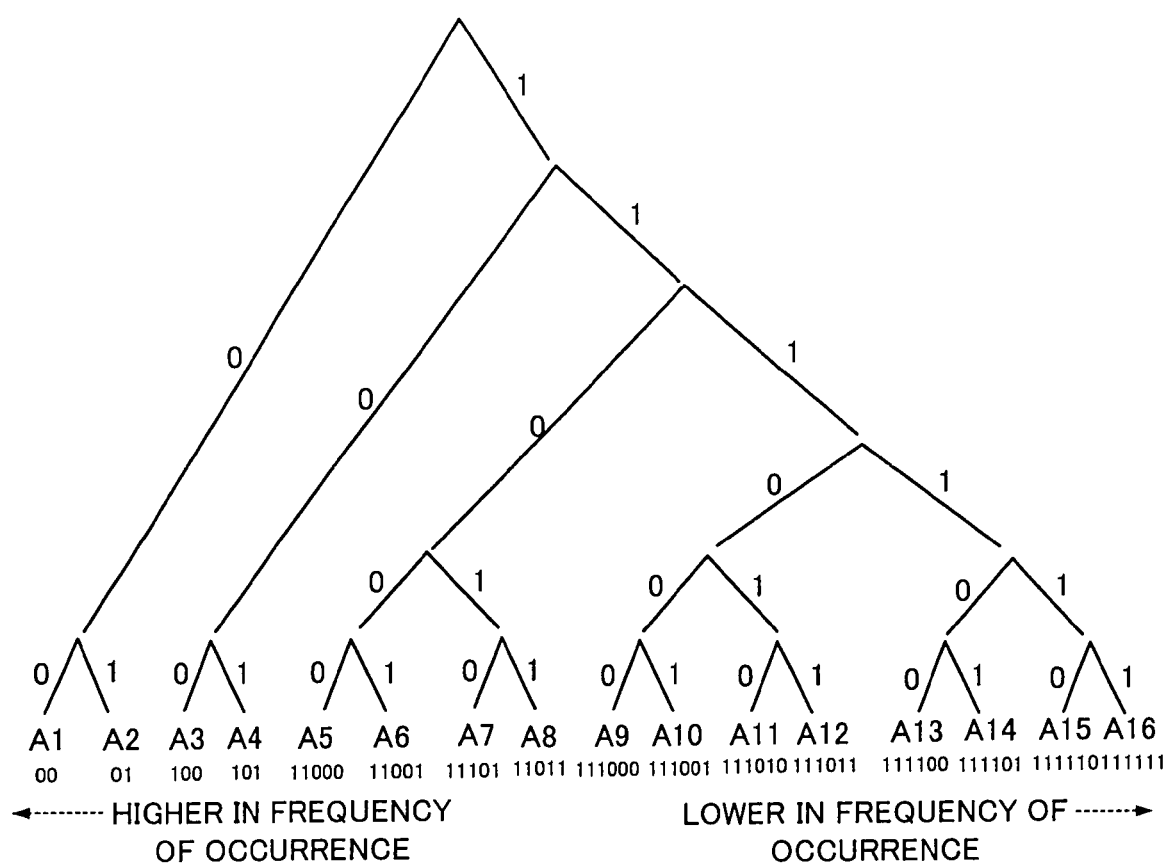
FIG. 14 is an explanatory view useful for understanding an example of scanning results by the data scanning section.

FIG. 14 is an explanatory view useful for understanding an example of scanning results by the data scanning section 552.

Here, the frequency of occurrence of the pixel value "A1" is highest, and "A2", "A3", "A4" . . . are higher in the named order. Incidentally, "A1" "A2", "A3", "A4" . . . do not represent directly the numerical value, and are codes each representative of the numerical value. That is, "A1" denotes, for example, the numerical value "00", and "A2" denotes, for example, the numerical value "FF". Further, according to the present embodiment, for the purpose of simplification, it is assumed that all pixels of data, which is transmitted from the run length coding section 551 in FIG. 3, are represented by anyone of 16 pieces of numerical values "A1" to "A16". The data scanning section 552 creates the Huffman table in such a manner that codes are assigned to those 16 pieces of numerical values in accordance with the frequency of occurrence of the data value. More in detail, "A1", which is highest in frequency of occurrence, is allocated "00" expressed with 2 bits. "A2" is allocated "01" expressed with 2 bits. "A3" and "A4" are allocated "100" and "101", respectively, which are expressed with 3 bits. And "A5" to "A8" are allocated the associated numerical values, respectively, which are expressed with 5 bits. Hereinafter, in a similar fashion, the lower numerical values in frequency of occurrence are allocated the associated numerical values with the more number of bits, respectively.

FIG. 15 is a view useful for understanding an example of the Huffman table.

The Huffman table is harmonized with FIG. 14. That is, the Huffman table is a table that indicates an association between numerical values before coding (before replacement) and numerical values after coding (after replacement) so that data is replaced by numerical values expressed with the shorter number of bits, the higher the frequency of occurrence is concerned.

In the Huffman coding section 553, which constitutes the H-plane compression section 550 of FIG. 3, numerical values of data are encoded in accordance with the Huffman table, so that many numerical values are replaced by codes each short in the number of bits. Thus, it is possible to implement the data compression.

In this manner, with respect to the upper order sub-plane D1H which is fed to the H-plane compression section 550 of FIG. 3, it is subjected to the coding by the run length coding section 551 and the coding by the Huffman coding section 553. Thus, the upper order sub-plane D1H is compressed at the high compressibility to offer the upper order compressed data D2H.

In the Huffman coding section 541 of the L-plane compression section 540 of FIG. 3, in a similar fashion to that of the run length coding section 551 of the H-plane compression section 550, the processing is performed in such a manner that two sets of 4 bits of numerical values are regarded as a set of 8 bits numerical values. Further, in the coding processing of the Huffman coding section 541, there is performed the same processing as the coding processing by the Huffman coding section 553 of the H-plane compression section 550, excepting a point that a fixed Huffman table is used. As a result, the lower order sub-plane D1L offers the lower order compressed data D2L.

Individual sorts of processing as mentioned above are performed by the differential coding section 510, the offset section 520, the plane division section 530, the L-plane compression section 540, and the H-plane compression section 550, as shown in FIG. 3, so that the TRUE pixel data is compressed on a reversible compression basis, and particularly a drastic data compression is implemented on data of CT image.

The above-mentioned explanation is concerned with processing for the TRUE pixel obtained from the TRUE pixel in FIG. 6.

On the other hand, as explained in conjunction with FIG. 6, the non-TRUE pixel data, which is obtained from the non-TRUE pixels (for example, FAKE pixels expressed by a mark "F" in FIG. 6, pseudo TRUE pixels expressed by a mark "D" in FIG. 6, and pixels represented by the mark "●"), which are not subjects of thinning in the thinning processing section 505, is fed to the non-TRUE pixel compression section 560 shown in FIG. 3 so as to be subjected to the non-compression processing. Hereinafter, this processing will be explained.

The non-TRUE pixel data, which is fed to the non-TRUE pixel compression section 560, is transferred to the bit reduction section 561. The bit reduction section 561 selectively carries out either one among 8 bits of coding, 4 bits of coding, and 0 bits of coding (the substantial data removal) in accordance with whether the non-TRUE pixel data is concerned with the pixel data on the edge portion.

The edge detection section 525 of FIG. 3 performs a determination of the edge portion in accordance with the differential data after offset. First, the determination of the edge portion will be explained.

As mentioned above, the pixel values of the TRUE pixel shown in FIG. 6 are expressed with Tn_k. The bit reduction section 561 determines, as the edge portion, a block of 4×4 pieces of pixels wherein the TRUE pixel, of which the pixel values are expressed with Tn_k, is established in form of a vertex of the left side of FIG. 6, in the event that a differential value, which is obtained through the two-dimensional differential coding processing from pixel values Tn_k, Tn_k+4, Tn+4_k, Tn+4_k+4 of 4 pieces of TRUE pixel, where the differential value is a differential value on a base of a decimal system obtained through directly differentiating pixel values, but not a differential value expressed by the numerical values from the value "00" to the value "FF" on a base of a hexadecimal number system, is less than −64, or not less than +64.

For example, in the event that the differential value, which is obtained from pixel values T1_1, T1_5, T5_1, T5_5 of 4 pieces of TRUE pixel shown in FIG. 6, satisfies the above-mentioned conditions, the bit reduction section 561 determines, as the edge portion, a block of 4×4 pieces of pixels wherein the TRUE pixel, of which the pixel values are expressed with T1_1, and three FAKE pixels, of which the pixel values are expressed with F4_1, F4_4, F1_4, are established in form of a vertex. Further, for example, in the event that the differential value, which is obtained from pixel values T1_5, T1_9, T5_5, T5_9 of 4 pieces of TRUE pixel shown in FIG. 6, satisfies the above-mentioned conditions, the bit reduction section 561 determines, as the edge portion, a block of 4×4 pieces of pixels wherein the TRUE pixel, of which the pixel values are expressed with T1_5, and three FAKE pixels, of which the pixel values are expressed with F4_5, F4_8, F1_8, are established in form of a vertex. Those decisions are repeated on each 4 pieces of TRUE pixel.

Thus, when the bit reduction section 561 determines, as the edge portion, a block of 4×4 pieces of pixels wherein the TRUE pixel, of which the pixel values are expressed with Tn_k, is established in form of a vertex of the left side of FIG. 6, in accordance with a differential value, which is obtained through the two-dimensional differential coding processing from pixel values Tn_k, Tn_k+4, Tn+4_k, Tn+4_k+4 of 4 pieces of TRUE pixel, then the three pixels, which are located among the TRUE pixel of which pixel value is expressed with Tn_k, and the remaining three TRUE pixel values Tn_k+4, Tn+4_k, Tn+4_k+4, are regarded as the pseudo TRUE pixel. The pixel values of the pseudo TRUE pixel are the subject of 8 bits of coding. On the other hand, of the block of 4×4 pieces of pixels, the remaining 12 pieces of pixels, which are not the TRUE pixel and the pseudo TRUE pixel, are regarded as the FAKE pixels, and the pixel values of the FAKE pixels are the subject of 4 bits of coding.

For example, it is assumed that the bit reduction section 561 determines, as the edge portion, a block of 4×4 pieces of pixels wherein the TRUE pixel, of which the pixel values are expressed with T1_1, and three FAKE pixels, of which the pixel values are expressed with F4_1, F4_4, F1_4, are established in form of a vertex, in accordance with the differential value, which is obtained from pixel values T1_1, T1_5, T5_1, T5_5 of 4 pieces of TRUE pixel shown in FIG. 6. In this case, the three pixels of which pixel values are expressed by D1_3, D3_1, D3_3, which are located among the TRUE pixel of which pixel value is expressed with T1_1, and three TRUE pixel values T1_5, T5_1, T5_5, are regarded as the pseudo TRUE pixel. On the other hand, of the block of 4×4 pieces of pixels, the remaining 12 pieces of pixels, which are not the TRUE pixel and the pseudo TRUE pixel, are regarded as the FAKE pixels. In a similar fashion, when the bit reduction section 561 determines, as the edge portion, a block of 4×4 pieces of pixels wherein the TRUE pixel, of which the pixel values are expressed with T1_5, and three FAKE pixels, of which the pixel values are expressed with F4_5, F4_8, F1_8, are established in form of a vertex, the three pixels, of which pixel values are expressed by D1_7, D3_7, D3_5, are regarded as the pseudo TRUE pixel. And, of the block of 4×4 pieces of pixels, the remaining 12 pieces of pixels are regarded as the FAKE pixels.

Also with respect to the thus determined pseudo TRUE pixels and FAKE pixels, in a similar fashion to that of the TRUE pixel data, there are constructed pseudo TRUE pixel data, which consist of a succession of pixel values of pseudo TRUE pixel, and FAKE pixel data.

Next, there will be explained a conversion of the FAKE pixel data into 4 bit data and a conversion of the pseudo TRUE pixel data into 8 bit data. First, there will be explained a conversion of the FAKE pixel data into 4 bit data.

FIG. 16 is a view useful for understanding a coding system into 4 bits code.

According to this coding system, a pixel value of the FAKE pixel is encoded into codes "1000" to "1111" in such a manner that 5 digits in the lower order of a bit value of 8 bits representative of the pixel value is omitted, and "1" is appended to the top of the remaining 3 digits in the upper order of the bit value. Accordingly, as shown in a table of FIG. 16, of numerical values "0" to "255" before coding, numerical values "0" to "31" are encoded into "1000", and numerical values "22" to "63" are encoded into "1001". In a similar fashion, the numerical values "64" to "95", "96" to "127", "128" to "159", "160" to "191", "192" to "223", and "224" to "255" are encoded into "1010", "1011", "1100", "1101", "1110", and "1111", respectively. This coding system is implemented through very simple processing such as an omission of digits of a bit value.

Next, there will be explained a conversion of the conversion of the pseudo TRUE pixel data into 8 bit data.

According to this coding system, a pixel value of the pseudo TRUE pixel is encoded into codes "0000 0000" to "0111 1111" in such a manner that 1 digit in the lower order of a bit value of 8 bits representative of the pixel value is omitted, and "0" is appended to the top of the remaining 7 digits in the upper order of the bit value. In a similar fashion to that of the conversion of the FAKE pixel data into 4 bit data, 256 tones of numerical values, which is representative of the pixel values of the pseudo TRUE pixel, are divided up among 128 classes.

The conversion of the FAKE pixel data into 4 bit data and the conversion of the pseudo TRUE pixel data into 8 bit data as mentioned above make it possible to maintain information of the edge portion to some extent and thereby avoiding deterioration of image quality.

The bit reduction section 561 performs 0 bit coding (the substantial data removal), in a block of 4×4 pieces of pixels wherein the TRUE pixel, of which the pixel values are expressed with $Tn\_k$, is established in form of a vertex of the left side of FIG. 6, in the event that a differential value, which is obtained through the two-dimensional differential coding processing from pixel values $Tn\_k$, $Tn\_k+4$, $Tn+4\_k$, $Tn+4\_k+4$ of 4 pieces of TRUE pixel, where the differential value is a differential value on a base of a decimal system obtained through directly differentiating pixel values, but not a differential value expressed by the numerical values from the value "00" to the value "FF" on a base of a hexadecimal number system, is not less than −64 and is less than +64, for the remaining 15 pieces of pixel values excepting the TRUE pixel, of which the pixel values are expressed with $Tn\_k$. Information of 15 pieces of pixel values is neglected in the step of the compression, but in the step of the expansion of the compressed data, the edge decision is again carried out in accordance with the pixel values of 4 pieces of TRUE pixel. Thus, as to 15 pieces of pixel values excepting the TRUE pixel, in a block of 4×4 pieces of pixels, which is decided as not the edge, a supplement of the 15 pieces of pixel values, which are lost in the step of the compression, is performed in such a manner that the interpolation processing is carried out in accordance with the pixel values of the surrounding TRUE pixel. According to the FIG. 6, the pixels, which are subjected to such a 0 bit coding, are expressed with the mark "●". In case of the CT image, since there is a high correlation between adjacent pixels, as explained in conjunction with FIG. 8 and FIG. 9, it is rare that a large differential value occurs, and a large number of pixels is not encoded and is neglected. Thus, it is considered that the drastic compression is expectable.

The non-TRUE pixel data is converted into 4 bits or 8 bits in accordance with the encoding by the bit reduction section 561 of FIG. 3, and accordingly data after the encoding includes 4 bits of code and 8 bits of code. However, the subsequent processing may divide the data in units of eight bits (byte packing). Thus, the run length coding section 562 and the Huffman coding section 563 in FIG. 3 execute the completely same processing as that of the H-plane compression section 550. The Huffman coding section 563 serves as both the data scanning section 552 and the Huffman coding section 553. In case of the CT image, since a lot of pixel values are coded into "0" in accordance with coding of the bit reduction section 561, it is possible to expect a drastic compression by the run length coding section 562.

The above explanation is concerned with the present embodiment.

Incidentally, according to the present embodiment, the data compression is applied to only the data of the CT image. However, according to a data compression apparatus of the present invention, it is acceptable that the data compression is applied to data of both the CT image and the LW image. Alternatively, it is acceptable that the data compression is applied to data representative of information other than images.

Further, according to the present embodiment, as an example of the difference creating section referred to in the present invention, there is disclosed one which determines a difference using a two-dimensional operation in which differences of both the length and breadth of an image are compounded. However, it is acceptable that the difference creating section referred to in the present invention determines one-dimensional difference in the main scanning direction and the sub-scanning direction.

Furthermore, according to the present embodiment, when a two-dimensional differential value, which is obtained from the pixel values of 4 pieces of TRUE pixel, belongs to a predetermined area, it is determined as the edge portion, so that there are provided 3 pieces of pseudo TRUE pixels at predetermined positions in a block of the pixels. However, according to the present invention, any one is acceptable, as the pseudo TRUE pixel, which is provided in accordance with a result of the differential value, and the present invention is not restricted to the way as explained above. For example, as a function having as a variable a two-dimensional differential value which is obtained from pixel values of 4 pieces of TRUE pixels, a number of pseudo TRUE pixels arranged in the block is expressed.

Specifically, there is considered such a scheme that if the two-dimensional differential value is not less −32 and is less than 32, no encoding is carried out; if it is not less −64 and is less than −32, or it is not less +32 and is less than +64, there is provided a piece of pseudo TRUE pixel in a block; if it is not less −96 and is less than −64, or it is not less +64 and is less than +96, there are provided two pieces of pseudo TRUE pixels in the block; and if it is less than −96, or it is not less +96, there are provided three pieces of pseudo TRUE pixels in the block.

According to the data compression apparatus and the data compression program storage medium according to the present invention as mentioned above, the compressed data is divided into the first compressed data in which the compressed data is periodically thinned, and the second compressed data concerning the remains. The reversible compression processing is applied to the first compressed data. The non-reversible compression processing is applied to the second compressed data. With respect to the second compressed data, the original information would be partially lost owing to the non-reversible compression processing. Since the CT image is strong in correlation between adjacent pixels, however, it is possible to maintain picture quality of the original image, even if the second compressed data is drastically compressed. Further, when the non-reversible compression section compresses the second compressed data, the non-reversible compression section switches the compression system in accordance with a result of detection of the edge portion of the image. Thus, it is possible to implement a drastic compression on the non-edge portion, and also to maintain the picture quality by means of restraining the compression on the edge portion. Furthermore, in the event that the edge portion of the image is detected, the numerical values, which are in a predetermined positional relation on the image, are relatively restrained from the compression as compared with the numerical values, which are not in the predetermined positional relation, and thus it is possible to suitably balance the maintenance of the image quality with the improvement of the compressibility.

The use of the difference creating section of the reversible compression section makes it possible to divide the new compressed data, which is subjected to offset in numerical value by the offset section, into the upper order data and the lower upper order data, so that the upper order data compression section and the lower order data compression section apply the reversible compression processing to the upper order data and the lower upper order data, respectively. Generally, in case of the new compressed data obtained from the CT data, the upper order data and the lower upper order data are extremely different from one another in distribution tendency of numerical values of data, and thus there is the reversible compression processing suitable for independent data. According to the compression processing of the present invention, it is possible to implement a great compressibility in its entirety. As the reversible compression processing to be applied to independent data, algorism is applicable for simple processing. Thus, according to the compression processing of the present invention, it is possible to reduce the processing time. In this manner, according to the reversible compression section having the difference creating section, it is possible to implement particularly a preferable reversible compression processing when the present invention is applied to the compression of the CT data.

In the event that the detecting section detects an edge portion of the image in accordance with the difference determined by the difference creating section, it is easy in the edge detection. In the event that the difference is two-dimensional one, the detection of the edge portion of the image is carried out with greater accuracy.

A preparation of the first coding section of the upper order data compression section encodes only the compression subject numerical value into the numerical value representative of the compression subject numerical value and the continued number. Thus, this feature makes it possible to avoid such a situation that the compressed data increases in redundancy more than the original data, and thereby improving compressibility.

A preparation of the second coding section of the upper order data compression section makes it possible to expect further improvement of compressibility by the entropy coding (typically Huffman coding).

According to the present invention, the upper order data compression section has the histogram computing section and the code allocating section, and the second coding section uses a table allocated in codes by the code allocating section to apply the entropy coding (for example, Huffman coding). This feature makes it possible to further improve compressibility as compared with the entropy coding using a table in which an allocation of codes is fixed.

Further, according to the present invention, the lower order data compression section applies the entropy coding. This feature makes it possible to expect further improvement of compressibility by the entropy coding (typically Huffman coding).

Furthermore, according to the present invention, the lower order data compression section outputs lower order data without any compression in accordance with an instruction of compression omission. This feature makes it possible to select a higher speed of compression processing.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A data compression apparatus that applies a data compression processing to data to be compressed, in which a two-dimensional image is represented by a succession of numerical values represented by a predetermined number of unit bits, the data compression apparatus comprising:
   a thinning processing means for periodically thinning numerical values from the succession of numerical values constituting compressed data so as to create a first compressed data consisting of a succession of numerical values derived from thinned compressed data, and a second compressed data consisting of a succession of remained numerical values;
   a reversible compression means for applying reversible compression processing to the first compressed data created by the thinning processing means;
   a detecting means for detecting an edge portion of the image; and
   a non-reversible compression means for providing such processing that
   (1) when the detecting means detects no edge portion on the numerical values constituting the second compressed data created in the thinning processing means, the non-reversible compression means outputs a predetermined code of a number of bits that is less than the predetermined number of unit bits,
   (2) when the detecting means detects the edge portion on the numerical values constituting the second compressed data created by the thinning processing means, the non-reversible compression means outputs
   (2a) a numerical value that is obtained by expressing one of the numerical values constituting the second compressed data by a first number of bits that is less than the predetermined number of unit bits if the one of the numerical values constituting the second compressed data is involved in a predetermined positional relation on the image with the numerical values constituting the first compressed data, and
   (2b) a numerical value that is obtained by expressing one of the numerical values constituting the second compressed data by a second number of bits that is less than the first number of bits if the one of the numerical values constituting the second compressed data is not involved in the predetermined positional relation on the image with the numerical values constituting the first compressed data.

2. A data compression apparatus according to claim 1, wherein the non-reversible compression means omits lower digits of bit values of the predetermined number of unit bits to express the numerical values with the first number of bits and/or the second number of bits.

3. A data compression apparatus according to claim 1, wherein the non-reversible compression means comprises:
   a difference creating means for determining differences between a plurality of numerical values each adjacent to an associated numerical value on a succession of numerical values constituting the first compressed data created in the thinning processing means, so that new compressed data consisting of a succession of numerical values representative of the differences is created;
   an offset means for offsetting the numerical values constituting the new compressed data, which are created in the difference creating means, by a predetermined value;
   a dividing means for dividing the individual numerical values of the compressed data offset in numerical value by the offset means into an upper order unit bit portion and a lower order unit bit portion at a predetermined number of divisional bits that is less than the predetermined number of unit bits, so that the compressed data is divided into upper order data consisting of a succession of numerical values of the upper order unit bit portion and lower order data consisting of a succession of numerical values of the lower order of unit bit portion;
   an upper order data compression means for applying reversible compression processing to the upper order data divided by the dividing means; and
   a lower order data compression means for applying the reversible compression processing to the lower order data divided by the dividing means.

4. A data compression apparatus according to claim 3, wherein the detecting means detects an edge portion of the image in accordance with the differences determined by the difference creating means.

5. A data compression apparatus according to claim 3, wherein the difference creating means determines a two-dimensional difference based on a plurality of numerical values each adjacent to an associated numerical value in a plurality of directions looking on an image, on the numerical values constituting the first compressed data, and
the detecting means detects an edge portion of the image in accordance with the difference determined by the difference creating means.

6. A data compression apparatus according to claim 3, wherein the upper order data compression means comprises a first coding means for performing such coding processing that numerical values excepting one or a plurality of predetermined compression subject numerical values of the upper order data are directly outputted without any processing, and compression subject numerical values are encoded into the compression subject numerical values and numerical values indicative of a continued number of the same compression subject numerical values as the compression subject numerical values.

7. A data compression apparatus according to claim 3, wherein the upper order data compression means comprises:
a first coding means for performing such coding processing that numerical values excepting one or a plurality of predetermined compression subject numerical values of the upper order data are directly outputted without any processing, and compression subject numerical values are encoded into the compression subject numerical values and numerical values indicative of a continued number of the same compression subject numerical values as the compression subject numerical values, and
a second coding means for applying entropy coding to data subjected to coding by the first coding means using a table for associating codes with numerical values.

8. A data compression apparatus according to claim 3, wherein the upper order data compression means comprises:
a first coding means for performing such coding processing that numerical values excepting one or a plurality of predetermined compression subject numerical values of the upper order data are directly outputted without any processing, and compression subject numerical values are encoded into the compression subject numerical values and numerical values indicative of a continued number of the same compression subject numerical values as the compression subject numerical values, and
a second coding means for applying Huffman coding to data subjected to coding by the first coding means using a Huffman table.

9. A data compression apparatus according to claim 3, wherein the upper order data compression means comprises:
a first coding means for performing such coding processing that numerical values excepting one or a plurality of predetermined compression subject numerical values of the upper order data are directly outputted without any processing, and compression subject numerical values are encoded into the compression subject numerical values and numerical values indicative of a continued number of the same compression subject numerical values as the compression subject numerical values;
a histogram computing means for determining a histogram of numerical values appearing on data subjected to coding by the first coding means;
a code allocating means for allocating shorter codes in code length as higher numerical values in frequency of occurrence to a table for associating codes with numerical values in accordance with the histogram determined in the histogram computing means; and
a second coding means for applying entropy coding to data subjected to coding by the first coding means using the table subjected to a code allocation by the code allocating means.

10. A data compression apparatus according to claim 3, wherein the lower order data compression means applies entropy coding to the lower order data using a table for associating codes with numerical values.

11. A data compression apparatus according to claim 3, wherein the lower order data compression means applies Huffman coding to the lower order data using a Huffman table.

12. A data compression apparatus according to claim 3, wherein the lower order data compression means outputs the lower order data with non-compression in accordance with an instruction of compression omission.

13. A non-transitory computer-readable storage medium storing a data compression computer program, which causes an information processing apparatus to operate as a data compression apparatus that applies a data compression processing to data to be compressed, in which a two-dimensional image is represented by a succession of numerical values represented by a predetermined number of unit bits, the program comprising:
a thinning processing periodically thinning numerical values from the succession of numerical values constituting compressed data so as to create a first compressed data consisting of a succession of numerical values derived from thinned compressed data, and a second compressed data consisting of a succession of remained numerical values;
a reversible compression applying reversible compression processing to the first compressed data created by the thinning processing means;
a detecting processing detecting an edge portion of the image; and
a non-reversible compression providing such processing that (1) when the detecting means detects no edge portion on the numerical values constituting the second compressed data created in the thinning processing means, the non-reversible compression means outputs a predetermined code of a number of bits that is less than the predetermined number of unit bits, (2) when the detecting means detects the edge portion on the numerical values constituting the second compressed data created by the thinning processing means, the non-reversible compression means outputs
(2a) a numerical value that is obtained by expressing one of the numerical values constituting the second compressed data by a first number of bits that is less than the predetermined number of unit bits if the one of the numerical values constituting the second compressed data is involved in a predetermined positional relation on the image with the numerical values constituting the first compressed data, and
(2b) a numerical value that is obtained by expressing one of the numerical values constituting the second compressed data by a second number of bits that is less than the first number of bits if the one of the numerical values constituting the second compressed data is not involved in the predetermined positional relation on the image with the numerical values constituting the first compressed data.

* * * * *